June 20, 1961  E. F. ANDREWS  2,989,268
CONVERTIBLE AIRCRAFT
Filed Jan. 27, 1953  9 Sheets-Sheet 1
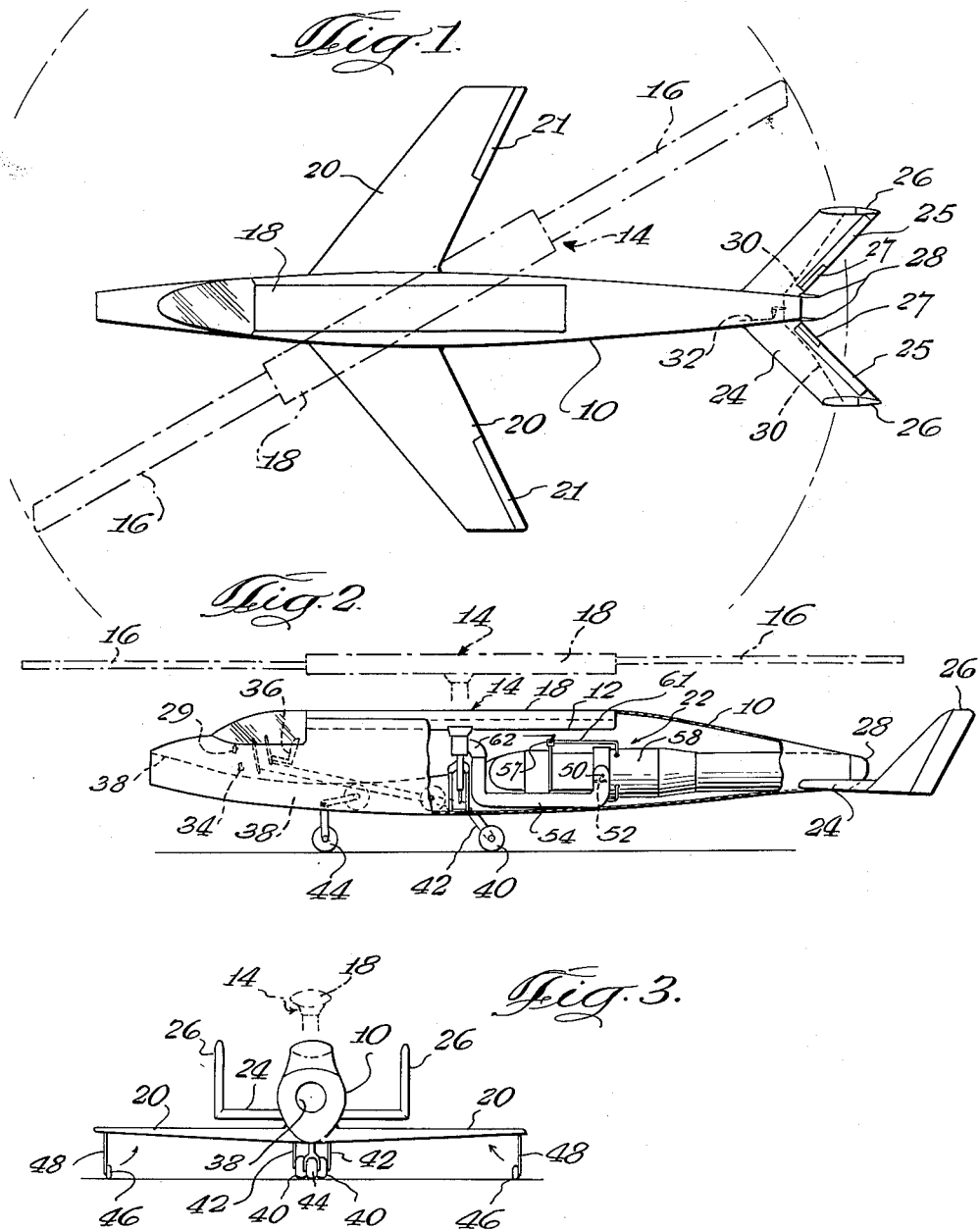
Inventor
Edward F. Andrews
By
Attorney

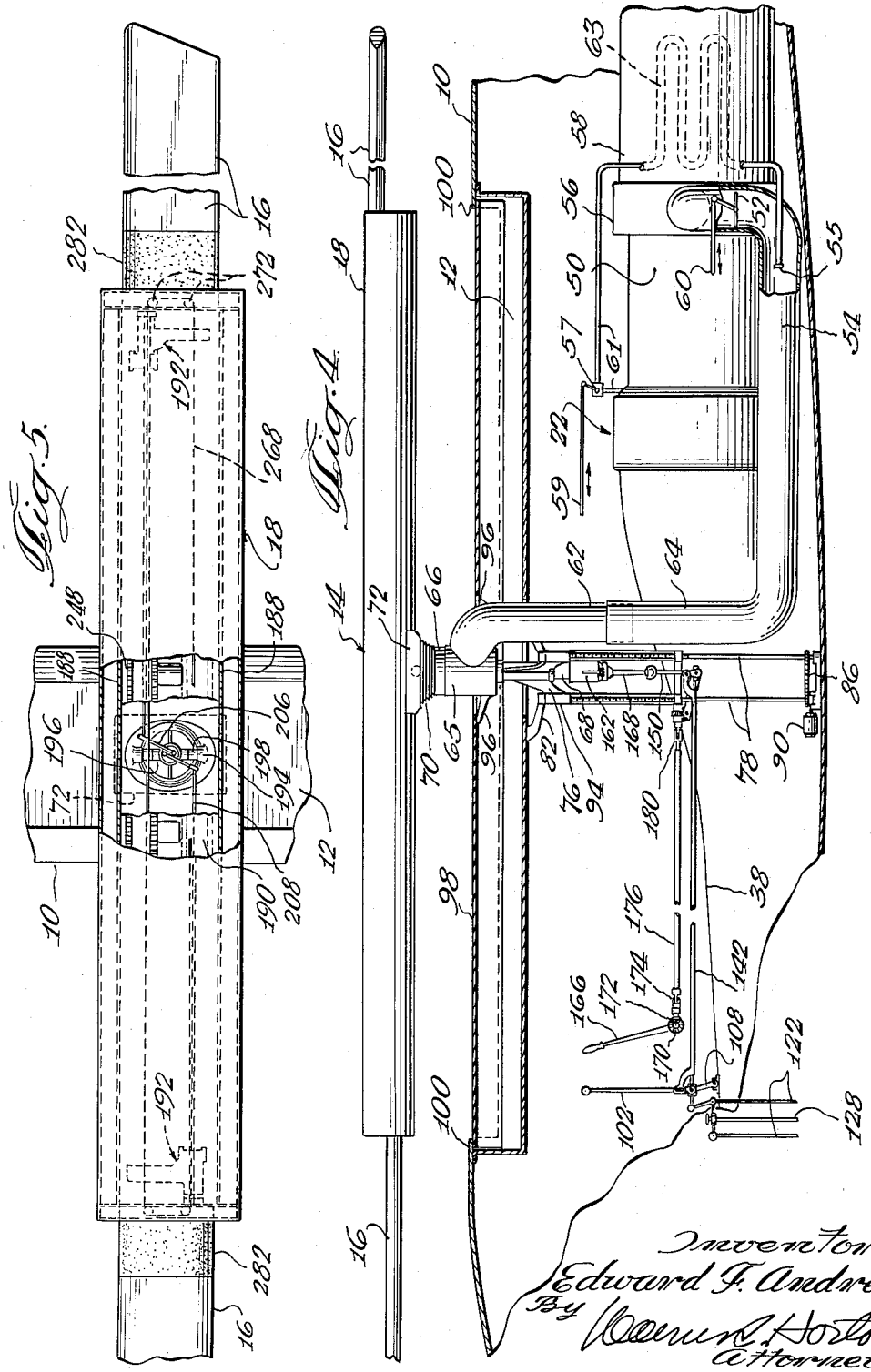

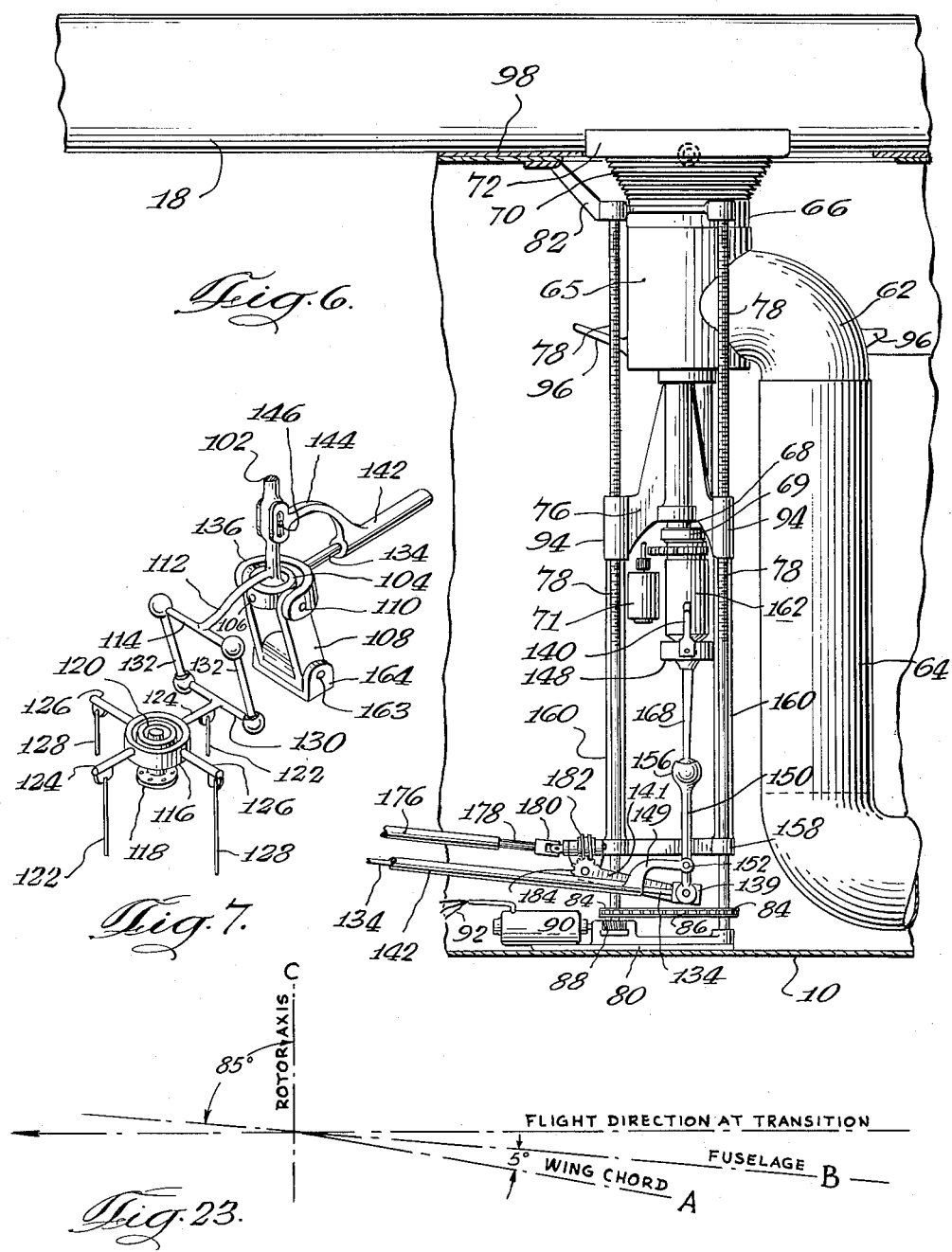

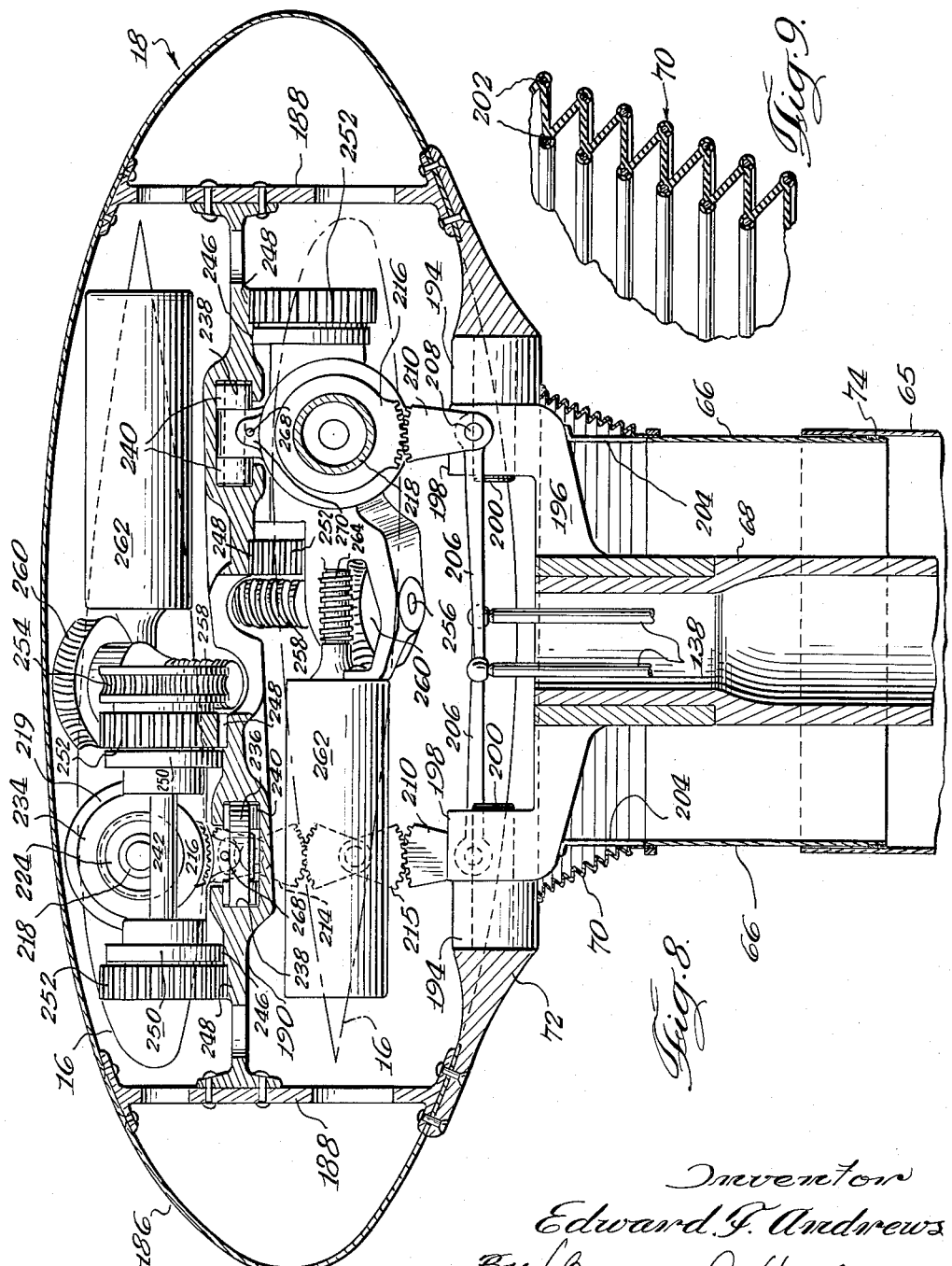

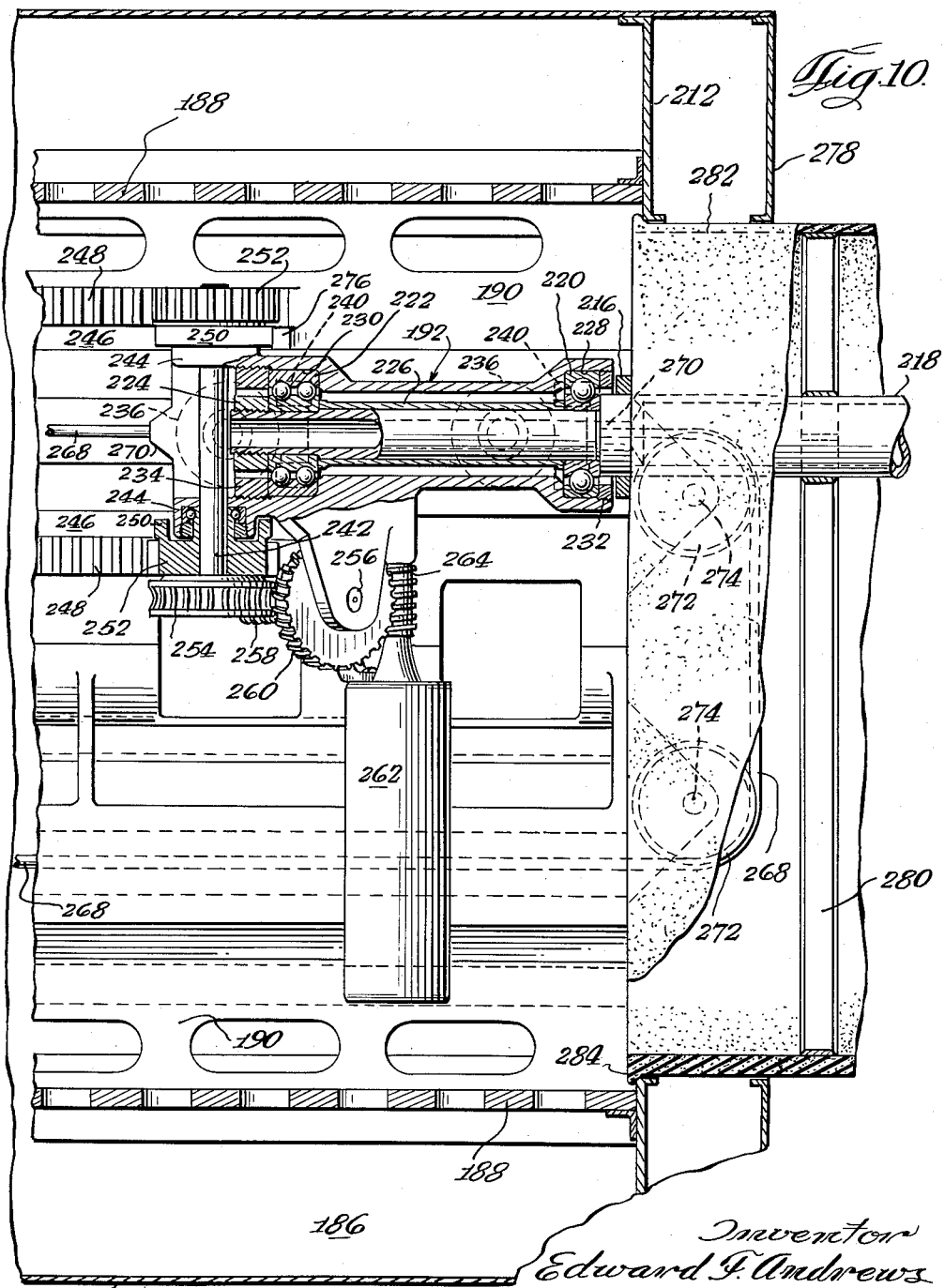

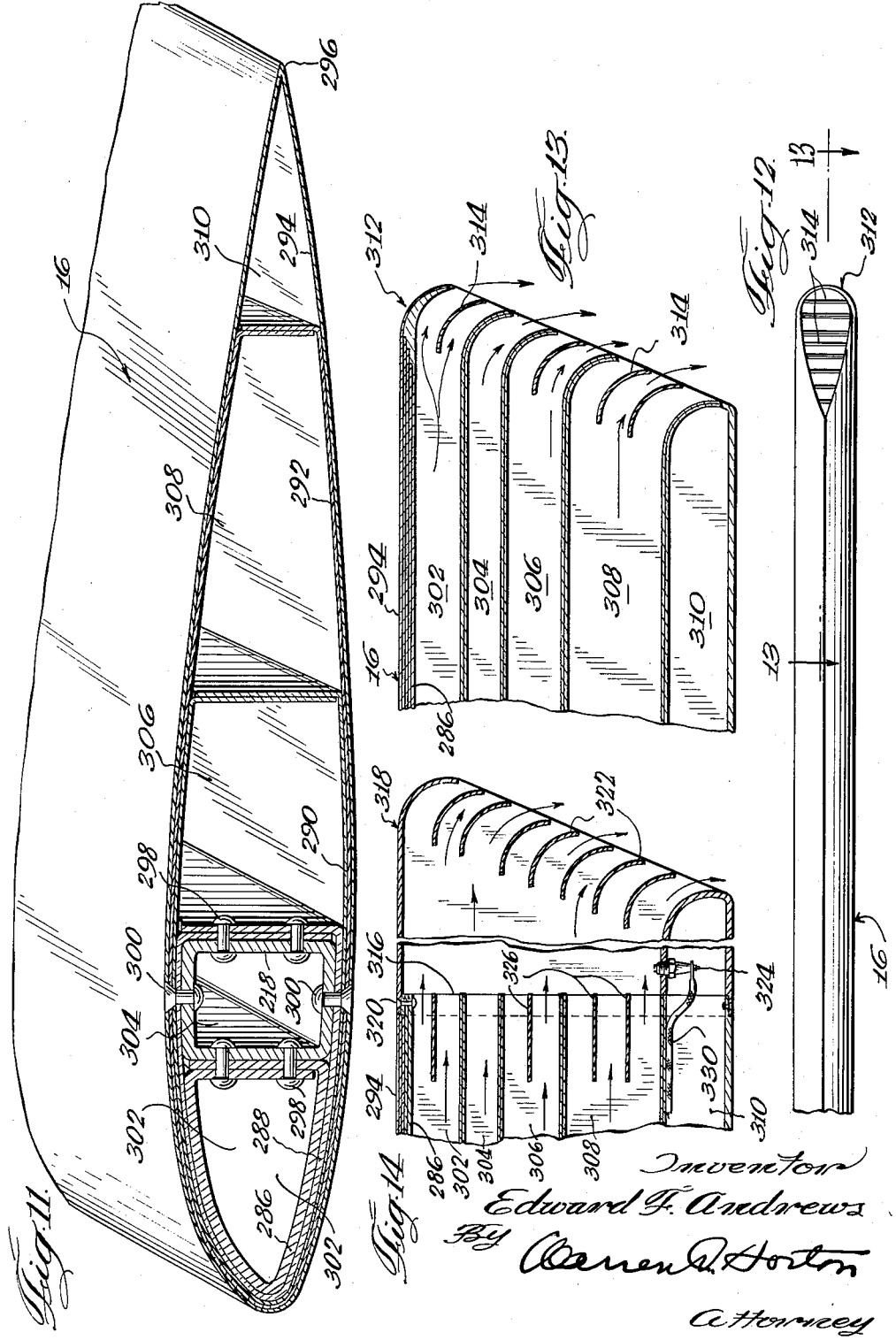

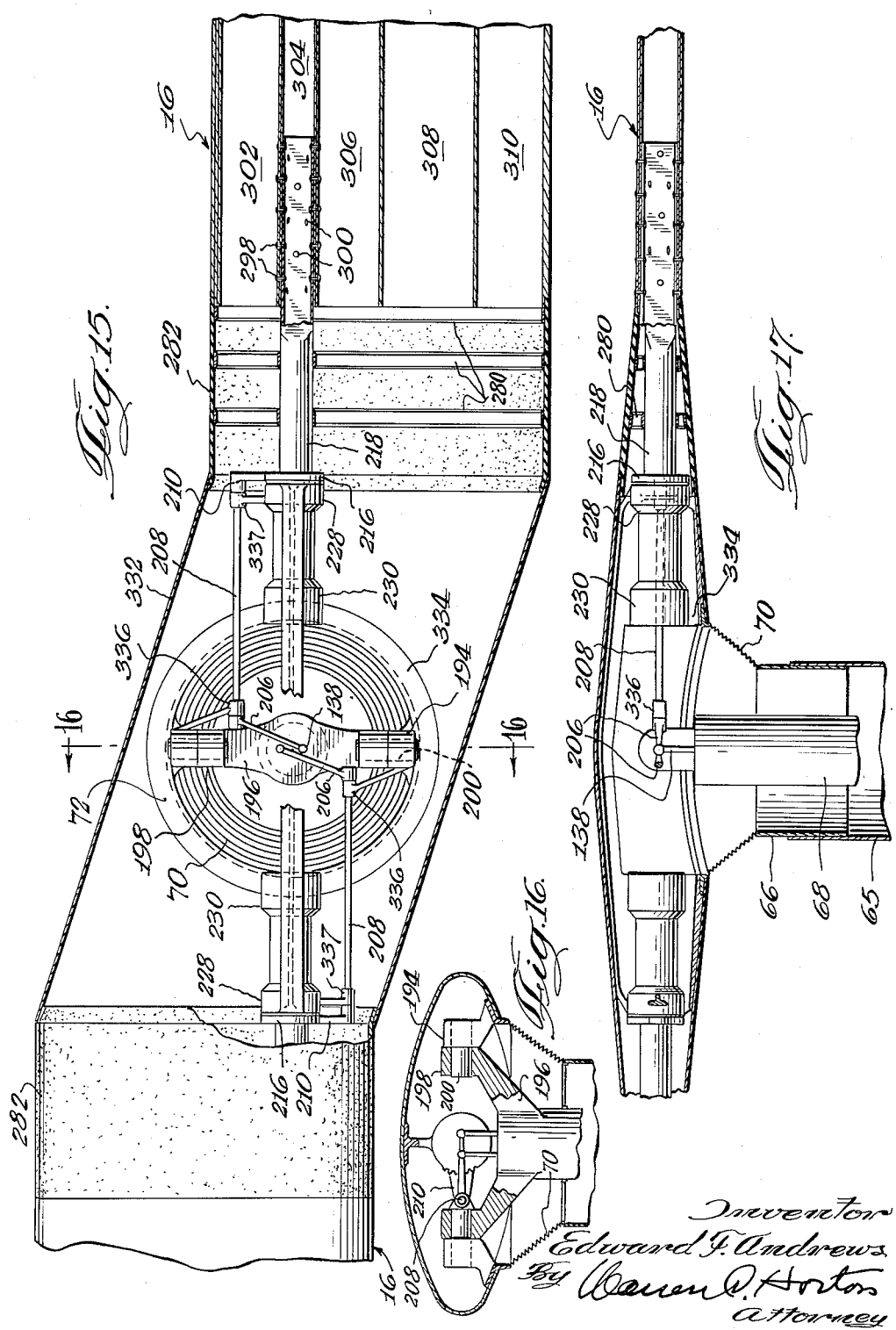

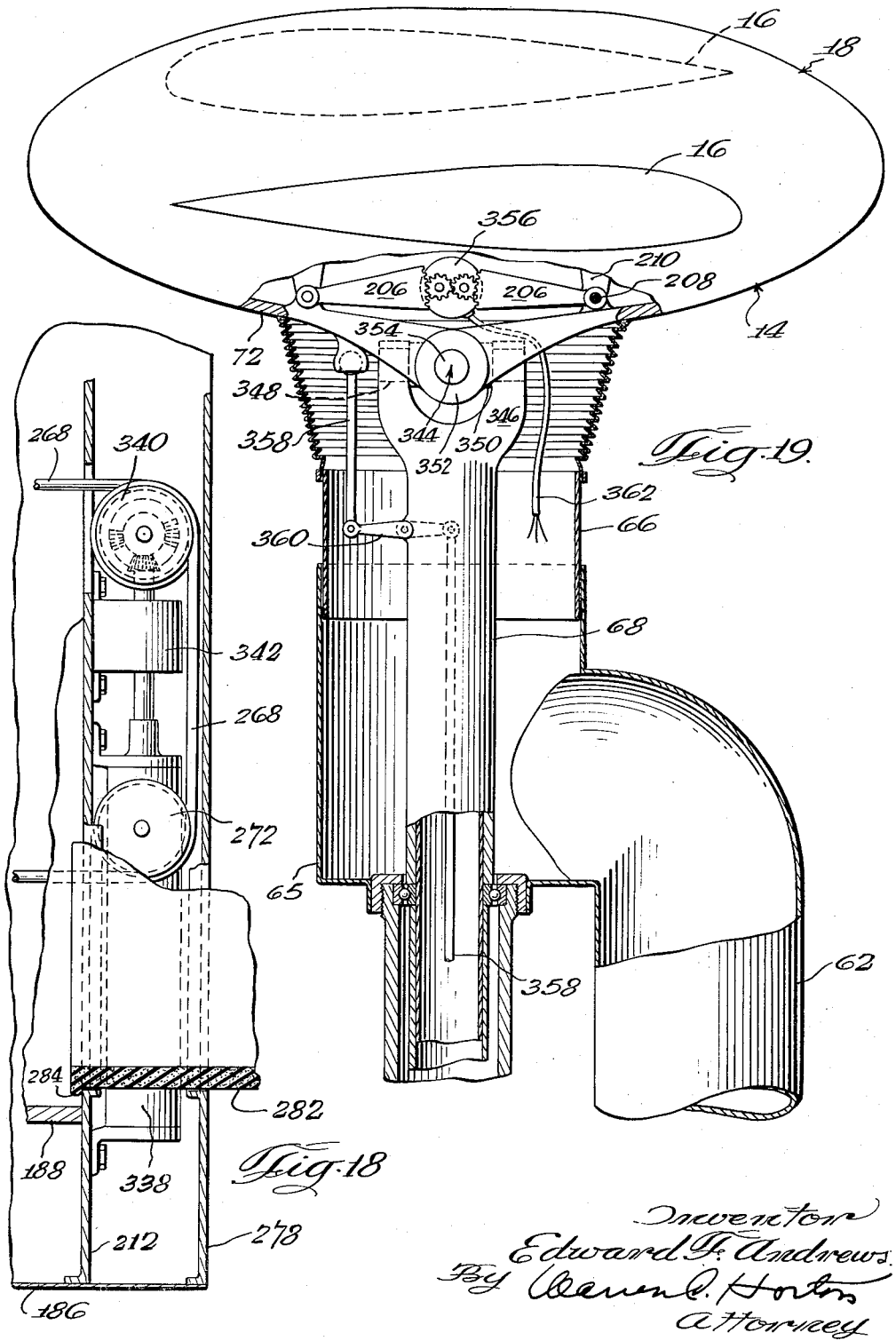

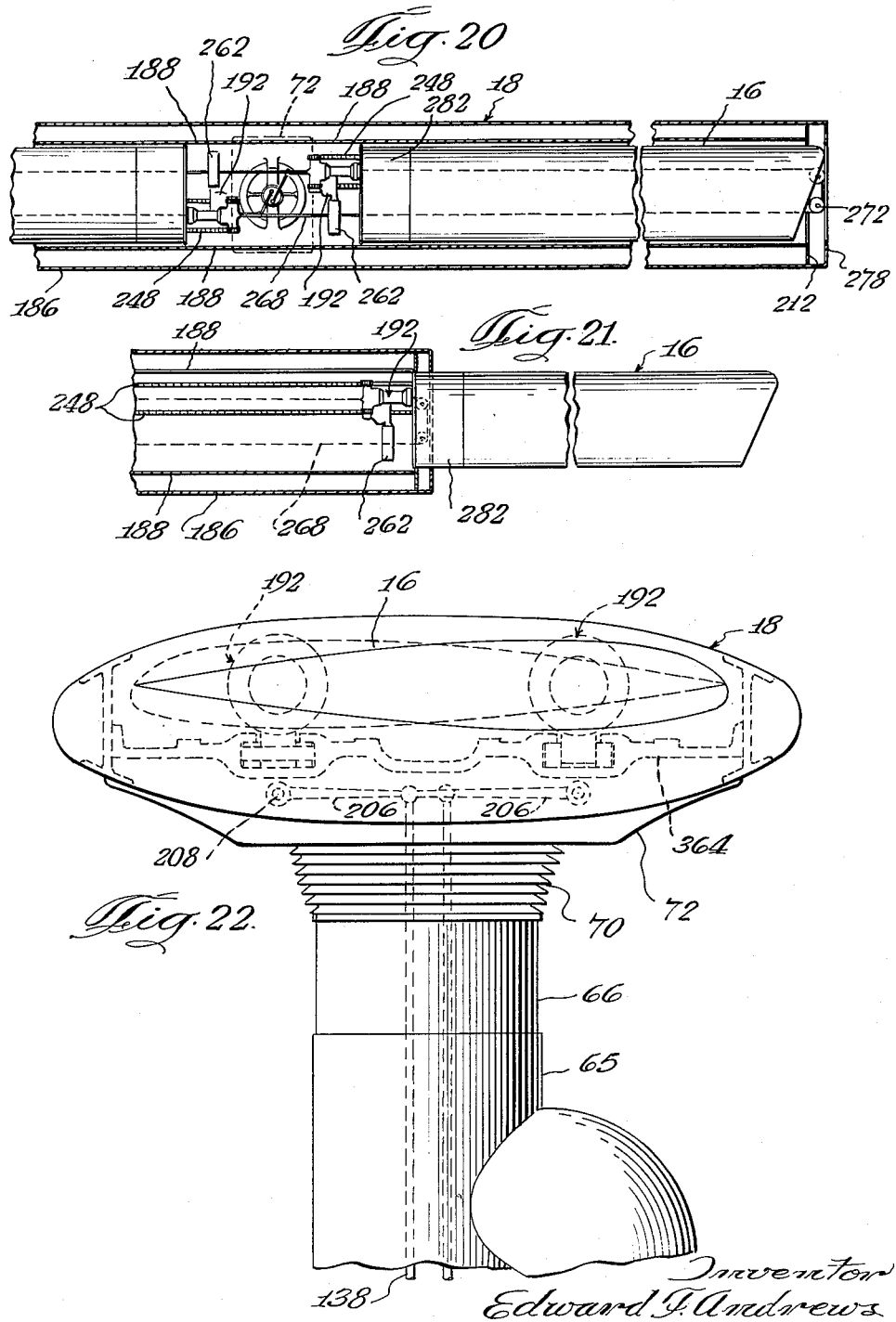

United States Patent Office 2,989,268
Patented June 20, 1961

2,989,268
CONVERTIBLE AIRCRAFT
Edward F. Andrews, 105 15th St.,
Belleair Beach, Largo, Fla.
Filed Jan. 27, 1953, Ser. No. 333,403
27 Claims. (Cl. 244—7)

This invention relates to rotating wing aircraft and more particularly to such aircraft having a fixed wing in addition to the rotating wing. In such aircraft the speed range is greatly extended by carrying all or nearly all the weight of the aircraft on the rotating wing during hovering or low speed flight while all or a large part of the weight is carried by the fixed wing during high speed flight. During high speed flight, the rotor provides little or no forward propulsion. This is supplied by a generally horizontal fluid jet. The speed is increased by maintaining the rotor in a lightly loaded or non-lifting condition with its plane of rotation generally parallel to the flight direction. A still further increase results from completely retracting the rotor. To obtain good hovering and low speed characteristics, the rotor may be large. Therefore, retraction is facilitated by first substantially contracting the rotor; for instance as shown in my Patent No. 2,464,285 and more specifically herein. As the rotor is retractible and used only for low speed flight, it should add as little weight as possible to the weight of the aircraft. This is facilitated by driving the rotor from the same power plant that provides the horizontal thrust. When very high speed is required, this may be a turbo jet power plant. In this case it is advantageous to effect the rotative drive of the rotor by compressed air issuing rearwardly from the rotor tips either with or without the burning of additional fuel at the blade ends. Such an aircraft presents outstanding advantages both for military and other uses as it permits high speed without requiring large specially prepared airports for takeoff or landing. In fact, such an aircraft may attain near sonic speeds and at the same time land and take off practically anywhere without requiring any airport at all. When moderate top speed is sufficient, unloading the rotor without retraction and a high speed turbo propeller or fan for horizontal thrust may be employed. The employment of rotor jet drive creates a need for novel rotor blade construction which provides a smooth unobstructed interior for the passage of fluid through the blade with minimum fluid losses. A rotor blade structure meeting these requirements is herein provided, together with other novel and advantageous features.

It is an object of this invention to provide an improved rotating wing aircraft.

It is a further object to provide an aircraft of increased speed range having a rotating wing for low speed flight and a fixed wing for high speed flight.

It is a further object to provide advantageous means to eliminate or reduce the drag of the rotating wing during high speed flight.

It is a further object to provide an advantageous jet driven rotor for rotating wing aircraft.

It is a further object to provide an improved blade pitch control connection, and an improved sealed passage for the propulsive jet fluid from the fuselage to the center section and between the center section and the blades.

It is a further object to provide contractible and retractible propulsive fluid passages in a retractible rotor aircraft.

It is a further object to provide advantageous means for securing horizontal propulsion as well as fluid jet drive for the rotor from the same turbo power source.

It is a further object to provide satisfactory flapping and pitch change bearings and disconnectible control means, in a rotor having blades which contract one above the other into the center section.

It is a further object to provide a medium speed aircraft with a non-contractible jet driven rotor supplied with propulsive fluid from a turbo-prop power plant which provides horizontal thrust for a fixed wing carrying practically all of the weight at high speed and little or none at low speed.

It is a further object to provide a rotor blade construction specially suited to pressure jet propulsion in which a smooth free passage is provided through the blade to rearwardly directed jet outlets at the blade tips.

It is also a still further object of this invention to provide advantageous means for realizing the purposes set forth above and in the following description.

FIG. 1 is a plan view of the convertible aircraft of this invention with the rotating wing shown in dot-dash lines in the expanded position;

FIG. 2 is a side elevation of the convertible aircraft of my invention with the rotating wing shown in dot-dash lines in extended position and with a section of the fuselage cut away to show the turbo jet power plant, etc.;

FIG. 3 is a front elevation corresponding to FIGS. 1 and 2 with all elements of the alighting gear extended and with the rotating wing shown extended in dot-dash lines;

FIG. 4 is an enlarged fragmentary section of FIG. 2 showing the fuselage mechanism contained therein;

FIG. 5 is a plan view of the rotating wing partially broken away shown extended and cross-wise of the fuselage;

FIG. 6 is an enlarged view of the retraction and extension mechanism shown in the retracted position;

FIG. 7 is an isometric view showing an enlarged portion of the control mechanism enlarged;

FIG. 8 is a cross section of the rotating wing, including the shaft, fluid passage, and blades;

FIG. 9 is an enlarged cross sectional fragmentary view of the flexible connection;

FIG. 10 is a plan section through one end of the center section showing the inner end of the blade mounted on its carriage;

FIG. 11 is an isometric sectional view showing the construction of the blade;

FIG. 12 is a rear view of the blade tip;

FIG. 13 is a section taken on the line 13—13 of FIG. 12;

FIG. 14 is a modification of the blade tip of FIG. 13 adapted for blade tip combustion;

FIG. 15 is a plan view partially in section of a modification in which the blades are not contractible;

FIG. 16 is a sectional view taken on the line 16—16 of FIG. 15;

FIG. 17 is a side view of the rotating wing of this modification in which parts are cut away and other parts shown in section;

FIG. 18 shows a further modification in which the expansion and contraction of the blades into the center section is effected by the motor driven drum and cable mechanism;

FIG. 19 is an embodiment showing a cyclical pitch change mechanism in which the center section is universally jointed to the shaft;

FIG. 20 is a plan view of a modification of the rotating wing in which the blades lie generally in the same plane and in which the blades are shown contracted;

FIG. 21 is a similar view showing one end of the center section with the blade expanded;

FIG. 22 is an end view of this embodiment showing both blades mounted on top of the blade carriage support plate; and FIG. 23 is a diagram showing an angular relation between the fuselage major axis, the chord of the fixed wing and the axis of the rotor which may be employed.

Referring to FIGS. 1, 2, and 3, the fuselage 10 of the convertible aircraft is provided with a depression 12. A contractible rotating wing 14 is mounted for rotation on the fuselage at the center of the depression 12. The rotating wing 14 is retractible into the depression 12 after the blades 16 have been contracted within the center section 18, as shown in full lines in FIG. 2. The rotating wing 14 may also be elevated above the fuselage and the blades 16 expanded so that they extend outwardly from opposite ends of the center section 18 as shown in dot-dash lines. The center section 18 is pivotally mounted at the hub for flapping motion. The embodiment of the convertible aircraft shown in FIGS. 1, 2, and 3 is equipped with swept-back wings 20 of relatively small area which are adapted to high speed flight when the aircraft is being propelled by the forward thrust of its turbo jet engine 22 with the rotating wing retracted. The wings 20 are provided with ailerons 21.

At the rear of the fuselage 10 is a swept-back elevator surface 24 having elevator flaps 25 and twin vertical rudders 26, one at each end of the elevator. Due to the backward sweep of the elevators and the employment of two rudders 26 and corresponding fin surfaces at the outer ends of the elevator, clearance is provided so that when the blades 16 are fully extended and flap downward around the flapping pivot as it passes the tail, it will clear the vertical fins and twin rudders 26. It will be seen that by the employment of the swept-back elevator in conjunction with the twin rudders located at the ends thereof, clearance is provided for a larger diameter rotating wing without undue rearward extension of the fuselage.

The rudders 26 are linked with jet rudders 28 by means of linkage 30. The rudders 26 and 28 are operated simultaneously by the control member 32 which may run to rudder pedals 34 in front of the pilot's seat 36. The main purpose of the jet rudders 28 is to provide control in yaw during slow speed operation when the weight of the aircraft is supported wholly or mainly by the rotating wing 14. Even though the aircraft is hovering and there is no relative air flow over the rudders 26, yaw control is provided by the high speed jet issuing between the jet rudders 28. The air intake of the turbo jet 22 may be located at the nose of the fuselage and the air conducted rearwardly to the turbo jet by bifurcated passages 38 which diverge around the pilot's seat, alighting gear, and rotating wing support, and converge again at the front of the turbo jet engine.

If desired, flush type twin air intakes on each side of the fuselage may be provided instead of the nose intake. The alighting gear is of the bicycle type. Two wheels 40 are provided to the rear of the center of gravity. Two supporting members 42 spaced apart sufficiently to clear the bottom supports are pivoted near the bottom of the fuselage, so that the wheels may retract forwardly and upwardly into the fuselage. A front wheel 44 is provided which may retract backwardly and upwardly into the fuselage, as shown in FIG. 2. Two balancing wheels 46 are pivotally connected by struts 48 to the wings 20. The wheels 46 are resiliently mounted, so that practically all of the weight of the aircraft is supported on the wheels 40 and 44, the wheels 46 merely acting to maintain the aircraft in an upright position without carrying a large weight. They therefore can be made small to retract readily into a thin high speed wing. The rotating wing when extended may be rotated by means of air jets issuing backwardly from the tips of the blades 16. The compressed air for the rotor drive may be supplied from the compressor 50 of the jet engine 22. As the speed of the convertible aircraft is slow during operation of the rotating wing, the power which the jet engine 22 must supply for horizontal propulsion is relatively small. Therefore air may be bled from the compressor 50 to drive the rotating wing while adequate thrust for low speed forward propulsion may still be provided. When the rotating wing is retracted, the fixed wing 20 sustains the weight of the aircraft for high speed flight. At this time, the valve 52 is closed and no air is diverted from the jet engine which gives its maximum forward thrust for high speed flight.

Referring to FIGS. 4 and 6, the air conduit 54 is connected at one end to the passage 56 which joins the outlet of the compressor 50 to the jet engine combustion section 58. It will be seen that the valve 52, which can be controlled from the pilot's position 36 by means of the connecting member 60, closes off the communication from the passage 56 to the conduit 54 when in the closed position as shown. When the valve 52 is more or less open, air compressed by the compressor flows through the conduit 54 and into the telescoping passage 62, the top end of which connects to the stationary element of the sealing chamber 65. This may surround at the top end the rotating element 66 of the sealing chamber which rotates with the rotor shaft 68. The rotating element 66 is connected by the flexible connection 70 to the center section flange member 72. This forms the air connection to the center section 18 through which air is supplied to the tip jets to rotate the blades 16. The connection between the sealing chamber 65 and top element 66 is rotative, and at least one sealing member 74 is provided to minimize air leakage between them. The joints between the members through which the compressed air passes should of course be highly resistant to air leakage.

If desired, vaporized fuel may be delivered into the passage 54 from the rotor fuel nozzle 55 to increase the thrust of the rotor jets with a given air flow from the compressor 50 through the valve 52. This can be effected by opening the fuel valve 57 by means of the control member 59 extending to the pilot's position. This fuel may be supplied to the rotor fuel line 61 from the fuel pump and fuel supply (not shown) of the turbo jet engine 22. A separate rotor fuel pump driven from the turbo jet engine 22 and connected to the turbo jet fuel supply may be employed, alternatively. The rotor fuel line 61 connects to a vaporizer passage 63 which may be placed around the outside of the combustion chamber, as shown, or around the jet exhaust, or in the tail cone. When the rotor fuel valve 57 is open, fuel flows through this vaporizer passage and is vaporized by the heat supplied from the combustion chamber or the jet exhaust. The vaporization of the fuel is thus accomplished mainly by employing waste heat from the turbo jet engine. The vaporized fuel then issues from the rotor fuel nozzle 55 and mixes with the air in the passage 54. It is then conveyed to the rotor jets at the blade tips, together with the compressed air, as previously described. The provisions required for burning the fuel air mixture at the blade tips will be later described.

The rotor shaft 68 is carried on the elevating member 76 by means of ball or roller bearings; for instance as shown in FIG. 3 of Andrews Patent No. 2,511,687. The elevating member 76 is mounted on three screw shafts 78. These are in turn rotatively mounted and supported in top plate 82 and fastened at the top and the bottom of the fuselage 10 respectively. A sprocket 84 is fixed at the bottom of each of the screw shafts. An endless sprocket chain 86 surrounds and connects the three sprockets 84. On one of the shafts 78 is a worm gear 88. An electric motor 90 is mounted on the base plate 80 with its shaft perpendicular to the screw shaft. The shaft of motor 90 carries a worm which engages the worm wheel 88 to rotate the screw shafts 78 simultaneously in one direction or the other. Conductors 92 run to appropriate controls in the vicinity of the pilot's seat to cause the motor 90 to stop or run in either direction. By causing the motor 90 to rotate in one direction, the screw shafts 78 rotate in appropriate nuts 94 in the elevating member 76 to raise the rotating wing to its extended position as shown in FIG. 4 or lower it to its retracted position on top of the fuselage center, as shown in FIG. 6.

When the elevating member 76 is in its top position, the telescoping passage 62 is raised so that it extends into the chamber 64 only a sufficient distance to effect a tight air seal. When the member 76 is in its lowermost position, the passage 62 telescopes into chamber 64. The sealing chamber 65 is mounted at the top of the elevating member 76. Supporting members 96 are fixedly mounted on the member 76 and chamber 65. The members 96 engage a sealing plate 98. When the rotating wing is retracted, the sealing plate 98 lies at the bottom of the depression 12 in the top of the fuselage into which the rotating wing 14 retracts. When the rotating wing is extended, the members 96 engage the plate 98 and raise it into firm contact with the inside of the fuselage skin, as indicated at points 100. This smoothly seals the top of the depression 12 when the rotating wing is extended, to reduce drag.

The sealing plate 98 is made in such a way as to be quite rigid in the direction of the major axis of the fuselage, but is flexible laterally so that when it is in the extended position as shown in FIG. 4 it will assume a convex form to match the curve of the fuselage. When it is in the retracted position as shown in FIG. 6, it will bend into a concave form lying closely against the concave bottom of the depression 12 provided in the fuselage for accommodating the retracted rotating wing 14.

In front of the pilot's position 36 is located a control lever 102 which may control the pitch and roll of the convertible aircraft both in the fixed wing and rotating wing flight regimes. In the fixed wing flight regime this lever 102 controls ailerons 21 for roll and the elevator flaps 25 for pitch. The control lever 102 is mounted at the bottom for universal movement. A gimbal ring 104 is provided for this purpose. The lever 102 is pivoted to the ring 104 by the pivot pin 106. The ring 104 is in turn attached to the swinging members 108 by pivot pin 110 at right angles to the pivot pin 106. A connecting member 112 is connected to the bottom of the lever 102 immediately above the ring 104. The member 112 carries a cross member 114. A universally mounted fixed wing control member 116 is mounted to the fuselage by a base member 118 and is universally movable relative thereto by means of a gimbal ring 120. The elevator flap cables 122 are connected to cross arms 124. A second pair of cross arms 126 are mounted on the fixed wing control member perpendicular to the cross members 124. The aileron control cables 128 connect to the cross arms 126. The two perpendicular axes of the gimbal ring 120 are coextensive with the two cross arms 124 and 126. On the rearward cross arm 124 is a cross member 130. The cross member 114 is connected to the cross member 130 by means of connecting members 132 attached by four ball and socket joints. It will be seen that if the lever 102 is moved forward or backward, it will cause the cross arms 124 to rock around one gimbal axis while the cross arm 126 does not rock because it is coextensive with the axis around which the rocking motion takes place. Thus the forward motion of the lever 102 operates the elevator flap 25 to produce downward pitch while the backward motion of the lever 102 moves the flap to cause upward pitch. On the other hand, if the lever 102 is moved sideways, cross arms 126 are caused to rock, while the cross arms 124 do not have this motion because they are now coextensive with the gimbal axis around which the motion occurs when the lever 102 is moved sideways. The rocking motion of the cross arms 126 causes the depression of the right aileron and the elevation of the left aileron 21 when the lever 102 is moved to the left. It will be understood that the cables 122 are connected to the elevator flaps 25 and the cables 128 are connected to the ailerons 21 in well-known manner, so as to produce the operation as above described. It may be pointed out that the links 132 and the swinging members 108 are provided so that a bodily movement of the lever 102 and the gimbal 104 forward and backward will not affect any control movement of the fixed wing control member 116. A forward and backward movement of the control lever 102 and the gimbal 104 occurs as a result of extending or contracting the rotating wing 14 as will be described.

A shaft 134 carries at one end a yoke 136. The other end of this shaft is fixedly mounted to a pivot member 139 which is in turn pivotally connected to lever 141. A tubular member 142 is slidably mounted on the shaft 134. The tubular member 142 is provided at one end with a slotted arm 144. Slotted arm 144 is connected to the lever 102 by a pin 146 passing through the bifurcated and slotted end of the arm 144. Thus when the lever 102 is rocked backward and forward the tubular member 142 slides back and forth on the shaft 134. At the other end of the tubular member 142 is a bifurcated arm 149 which is connected to the universally movable rotating wing control member 150. The arm 149 is connected to the member 150 by means of a pivot pin 152 passing through the bifurcated ends of the arm 149 and the hole in the lever 150. Thus it will be seen that a fore and aft movement of the lever 102 causes a corresponding movement of the lever 150, while a sideways movement of the lever 102 also causes a corresponding sideways movement of the lever 150. The lever 150 is connected to the lever 168 by means of a ball and socket joint 156. The lever 168 corresponds to the lever 168 shown especially in FIG. 3 of Andrews Patent No. 2,511,687, and the wabble plate 148 connects to the lever 168 in substantially the same manner as shown in this patent, and therefore need not be described further.

The control rods 138 shown in FIG. 8 correspond to the control rods 138 of the above mentioned patent and are connected to the brackets 140 in the same general way through the wabble plate 148 to the lever 168. The rods 138 therefore affect pitch and roll control of the rotating wing 14 during the rotating wing flight regime and corresponding movements of the lever 102 produce the same pitch and roll control effects as previously described in connection with the fixed wing controls. It will be seen that the lever 141 is pivotally mounted on a control support member 158. This member is mounted for sliding motions on the screw shafts 78 and is connected by tubular connecting members 160 to the elevating member 76. It will be seen that when the rotating wing is extended and the elevating member 76 moves to its "up" position, the control support member 158 will move upward with it. As the yoke 136 is connected to the gimbal ring 104 and the lever 102 by the pin 110, the upward movement of the control support member 158 will cause the lever 102 and gimbal 104 to move forward as a whole. This motion moves the swinging members 108 forward around the pivot 163 which is connected to the fuselage by the hinge member 164. This motion is transmitted through the shaft 134 and/or the tubular member 142. On the other hand, when the rotating wing is retracted and the elevating member occupies its lowermost position, the control support member 158 moves downward and the lever 102 and gimbal ring 104 move backward bodily. However, as previously described, this motion does not affect the movement of the control lever 102 around its universal pivotal point so that no influence is exerted on either the fixed or rotating wing controls by the retraction or extension of the rotating wing.

The swinging movement of the lever 168 by the lever 150 affects the differential cyclical pitch changes in the rotor blade angle to cause pitch and roll, while the vertical movement of the lever 168 by the lever 150 affects collective pitch control by a vertical movement of wabble plate 148 and collective pitch sleeve 162 by imparting a simultaneous vertical movement to the rods 138.

The lever 166 at the pilot's position 36 controls the collective pitch of the blades of the rotating wing. This lever carries a bevel gear 170 at its pivoted lower end which meshes with a bevel pinion 172. This pinion is connected through a universal joint 174 with a shaft 176. The other end of the shaft 176 is provided with a splined bore into which a splined sliding rod extends which carries a second universal joint 180, the other end of which connects to a worm gear 182. This worm gear meshes with a worm gear sector 184 on the pivoted end of the lever 141. The worm 182 and sector 184 are so constructed that when the lever 166 is moved forward, the collective pitch of the rotor blades 16 is reduced and when this lever is moved toward the rear the collective pitch is increased. This is effected by the corresponding upward and downward movements of the lever 141 around the end which is pivoted to the control support 158. The movement of the lever 166 causes the rotation of the shaft 176 and the worm 182 which in turn moves the lever 141. The universal joints 174 and 180 and the sliding spline rod 178 permit the elevating member 76 to move to the extended or retracted position without affecting the collective pitch control. At this point attention is called to the fact that a movement of the control lever 102 always produces the corresponding motion of the fixed wing controls. However, when the blades 16 are contracted into the center section 18, as will be described later, the blades 16 are fixed at approximately the angle of zero lift, and the pitch change connections between the blades 16 and the control rods 138 are disengaged at the outer end of the center section so that after the blades have been contracted a short distance, the movement of the control lever 102 and the lever 168 has no effect on the pitch of the blades. This is also true of the collective pitch lever 166.

The contractible rotating wing, shown in detail in FIGS. 5, 8, 9, and 10, is of the type shown in Andrews Patent No. 2,464,285 (FIGS. 1 and 2). The center section 18 comprises an outer shell 186 of sheet metal such as Dural. Shell 186 is secured to I-beam members 188 running from one end to the other of the center section. A blade carriage support member 190 also runs from one end to the other of the center section, and is secured to and between the I-beams 188. The I-beams are secured on the lower side of the center section near its center to the center section flange member 72. The member 72 is sufficiently wide to be secured, for instance by rivets, to the I-beams 188 along a substantial portion of their length, as shown in FIG. 5, to provide a strong attachment between the center section flange 72 and the blade carriage support 190 through the I-beams 188. The firm attachment of the shell 186 to the I-beams 188 forms a rigid center section assembly with a smooth low drag exterior and of relatively light weight.

The blades 16 are mounted on movable carriages 192 which in turn are slidably mounted on the carriage support member 190. The carriages 192 are movable from the expanded blade position, as shown in FIG. 5 and FIG. 10, with the blades outside extending outward from the center section, to a contracted position in which each carriage 192 moves to the opposite end of the center section and the blades 16 are coextensive with the center section 18. To permit this motion, one blade and carriage must move in a plane above or below the other. Thus one carriage 192 and blade 16 are positioned above the carriage support member 190 and the other below it. The center section flange 72 is provided with two bearing members 194. The shaft 68 carries at its upper end a yoke 196 equipped at each end with bearings 198. Pins 200 extend through corresponding bearings 194 and 198 and needle rollers may be provided between the bearings and pins if desired to reduce friction. These bearings constitute the attachment of the rotating wing 14 to the shaft 68 and also constitute the flapping axis of the rotor. As previously described, the flange 72 is connected to the rotating element 66 of the sealing chamber by the flexible connection 70 which seals the passage for compressed air from the sealing chamber 66 into the hollow interior of the center section 18. This flexible connection is constructed of flexible material such as a silicone or other plastic with continuous wire rings 202 embedded at the inner and outer edges of pleats therein to resist expansion by the internal air pressure. This flexible member 70 permits the flapping of the center section around the bearing pins 200 and still maintains a leak-proof air passage. It may be pointed out that the top element of the sealing chamber 66 is rigidly connected to the yoke 196 by support members 204. These insure concentricity of the element 66 and the element 65 of the sealing chamber and result in minimum obstruction to the free flow of air. The control rods 138 are connected at the top to pitch control levers 206. These levers 206 are mounted on the inner ends of shafts 208 which extend from the center to both ends of the center section. These shafts 208 are mounted in bearings at their inner ends. Each end of the center section is provided with an end plate 212. A second set of bearings is carried one by each end plate, and the outer ends of the shafts 208 are carried therein. Fixed to the outer end of each shaft 208 is a sector 210. One of these sectors 210 has substantial axial length and may extend a predetermined distance inward on shaft 208. The other of these sectors engages an idler sector 215. The sector 215 engages a second idler sector 214 which in turn engages sector 216 carried by the upper blade 16. The part of sector 214 engaging sector 216 also has substantial axial length. The long sector 210 engages the corresponding sector 216 connected to the lower blade 16. The upper sector 216 connected to the upper blade 16 engages the long idler sector 214. The connection of the long sector 210 and the long idler sector 214 with the sectors 216 is disconnected when the blades are contracted into the center section, thereby freeing the rotating wing control levers 102, 166, and 168, as previously described.

The blades 16 are connected at their inner ends to blade root members 218 which may be attached to the outer blade structure in a manner later to be described. It may be said, however, that the outer blade structure is torsionally rigid with respect to the blade root member 218 so that the rotation of this member causes the pitch of the entire blade to change correspondingly. The blade root member 218 is hollow and has a reduced diameter to fit the inner race of the outer pitch change bearing 220. Further toward the end, the diameter is reduced again to take the inner pitch change bearing 222. Beyond this bearing the member 218 is threaded for a retaining nut 224 which clamps the inner race of the bearing 222. The bearing 222 may be of double row ball type adapted to take the centrifugal thrust of the blade. A sleeve 226 is interposed between the inner races of the bearings 220 and 222 so that both of the inner races are clamped by the nut 224. Just outside of the bearing 220 the pitch control sector 216 is fixedly mounted on the wing member 218 so that when the shaft 208 is rotated and the sectors 210 and 214 are meshed with their corresponding sectors 216, the pitch of the blades 16 changes accordingly. The outer races of the bearings 220 and 222 are mounted in bearing-retaining sockets 228 and 230 in the carriage 192. The outer race of the bearing 220 is retained by the retaining nut 232, and the outer race of the bearing 222 is retained by the retaining nut 234. Thus the blade root member and the blade are securely mounted for pitch change rotation around the aerodynamic center of the blade 16. The carriage 192 is provided with two horizontal positioning rollers 236 which revolve on pins fixed to the carriage. These rollers fit closely in and against the side walls of a T-channel 238 in the carriage support plate 190. Thus the carriage is securely held against sidewise motion while being free to move from one end of the center section to the other. Two pairs of rollers 240 are also held on pins fixed to the carriage. The axes of these rollers are horizontal and they are of such diameter as to fit closely with only slight clearance against the top and bottom of the T-slot channel. All surfaces of the T-slot channel are smooth and regular to permit ready endwise movement of the carriage. The rollers 240 position the carriage securely in a vertical direction. Thus the blade 16 is positioned securely with relation to the center section 18 except that the blade is free to move in and out of the center section on its carriage and to change its pitch by means of the bearings 220 and 222.

The carriage 192 is also equipped at one end with a cross-shaft 242 mounted to the carriage by means of bearings 244. The carriage support plate 190 is also provided with tracks 246 and corresponding racks 248, both of which extend nearly to the ends of the carriage plate 190, there being one set above the plate for the upper carriage and a second set below the plate for the lower carriage. The cross-shaft 242 is provided at each end with a roller 250 engaging the track and a gear 252 engaging the corresponding rack. The diameter of the roller 250 is such that when it is in contact with its track 246, the pitch diameter of the gear 252 corresponds to the pitch line of the rack 248. Fixed to one end of the cross-shaft 242 is a worm wheel 254. An idler shaft 256 carries a worm 258 at one end which engages the worm wheel 254. At the other end of the idler shaft is a worm wheel 260. The idler shaft is carried in bearings secured to the carriage 192. An electric motor 262 is fixedly mounted to one side of the carriage 192. The shaft of this motor carries a worm gear 264 which engages the worm wheel 260. It will be seen that this arrangement provides a high reduction ratio from the motor shaft worm gear 264 to the cross-shaft 242. The motor is designed to provide high torque and for high rotative speed. It will be seen that the operation of the motor in one direction will cause its carriage to move toward one end or the other of the center section 18 carrying its blade 16 with it. The motors on the upper and lower carriages are so connected that the upper and lower carriages always travel in opposite directions. The upper and the lower carriages are connected together by a chain or cable 268 securely anchored to both carriages at 270. This cable passes around the pulleys 272 mounted on pins 274 fixed to extensions of the carriage support plate 190. Thus the two lengths of cable 268 are anchored one to each end of each carriage 192 so that the cables and the carriages form an endless cable system, the purpose of which is to insure the equal and opposite motion of the two carriages 192 and their respective blades 16. Thus the rotative balance of the rotating wing 14 is maintained regardless of the expansion or contraction of the blades.

Current may be supplied to the motors 262 by means of conductors (not shown) running from a power supply and reversible switch means located in the fuselage through slip rings and flexible connections to the center section and by means of rails engaged by sliding brushes on the motors. It will be seen that the rails 246 and the racks 248 end at a point somewhat inboard of the ends of the center section 18. A stop 276 is also provided against which the rollers 250 may stop when the blades are fully extended to guard against further outward movement. It may be noted that the center section should be made air-tight so as to avoid leakage of air supplied to the tip jets. A moderately close fitting opening is provided in the end plate 212 through which the blade 16 projects. An outer end plate 278 is also provided with a corresponding close fitting opening, thus providing an additional seal outside the pulleys 272. For a short distance outward from the inner end of each tip section, a flexible surface 282 of the blade is provided, and the ribs 280 are mounted for free rotation upon the round portion of the blade root member 218. The surface 282 is secured at its outer end to the remainder of the blade structure so as to form a continuous airfoil surface. At the inner end of the flexible surface 282, a flange 284 is provided which forms an air-tight seal against the end plate 212, being forced into close contact with it by the internal air pressure. This flexible surface section 282 permits the pitch of the blade 16 to be changed relative to the chord of the center section 18 and still preserves an unobstructed air-tight passage for the tip jet air from the center section into and through the blades. Due to the axial length of the sectors 210 and 214 they remain in mesh with the sectors 216 until the blades 16 are retracted into the center section 18, a distance greater than the length of the flexible sections 282. Thus the pitch of the blades 16 is always determined either by the meshing of the pitch control sectors or, when these unmesh, by the entry of the rigid inner portion of blades 16 into the close fitting openings in plates 212 and 278 of the center section 18.

The blade 16 is constructed so as to form a free and smooth passage for the compressed air through the blade from the center to the tip where it issues as a rotor propelling jet. The construction of the blade is shown in FIGS. 11 to 13, while FIG. 14 shows a modification of the tip in which fuel may be burned in the air stream immediately before it issues from the tip jets. To minimize frictional losses due to the rapid flow of fluid through the interior of the blade, internal obstructions and irregularities should be avoided as far as possible. Lightness, strength and ease of fabrication are also desired.

The blade root 218 is shown in FIG. 10. At its outer end there is a transition from a round to a square or rectangular cross section. The squared end projects into the inner end of the blade 16 and is securely fastened thereto by rivets or other securing means as shown in FIG. 11. The blade itself comprises a group of long sheets bent the long way into shells which may be of strong, light material such as Dural or plastic. The shells fit one within the other to form a nested assembly. The leading edge shell 286 may be of the thickest metal. This has a D-section, the forward portion having the nose shape of the aerofoil and the rear portions being lapped over one another to form a straight vertical rear wall. The second shell 288 is of similar shape, with vertical back wall formed in the same manner, but extends further rearwardly in a chordwise direction and may be of thinner sheet metal. The third shell 290 is similarly constructed but is still longer chordwise and made of thinner material. The fourth shell 292 is similarly constructed but the rear vertical walls are shorter in a vertical direction, as this shell extends well toward the trailing edge of the aerofoil. The fifth and outermost shell 294 forms the exterior of the blade and is of exactly the aerofoil section employed. The rear edges instead of being bent into a vertical rear wall are secured to each other without being bent to form the trailing edge 296 of the aerofoil.

As shown in FIG. 11, these five shells are inserted one into the other, the first shell being the innermost and the fifth and last shell the outermost. These shells may be of uniform section from root to tip and they may be fastened together into a rigid unitary structure by any desired means such, for instance, as spot welding, riveting, or cycle welding by means of strong durable adhesives. For instance, the outer surface of the first shell and the inner surface of the second shell may be thinly coated with a suitable adhesive before the first shell is inserted into the second or before the second is bent around the first. The same procedure may be followed in assembling the third, fourth, and fifth shells into a unit with the first two.

After each of the first four shells has been formed, the outside of one rear vertical wall and the inside of the other may be similarly coated with adhesive and pressed firmly together with or without heat to form each shell into a tightly closed tube. The square portion of the blade root member 218 may also be similarly coated and inserted a considerable distance into the blade between the rear wall of the first shell and the rear wall of the second shell. The first two shells 286 and 288 may be so proportioned that the center of the space between their rear walls corresponds to the quarter chord point or a point forward of the aerodynamic center. Thus the pitch change bearings 220 and 222 establish a pitch change axis near the aerodynamic center of the blade. Rivets 298 may be employed additionally to secure the blade root member to the first and second shells. Additional rivets 300 may be employed above and below additionally to hold shells 288, 290, 292, and 294 to the blade root member 218 and to each other. Although five shells have been described, it will be understood that a greater or lesser number may be employed as desired. It will be seen that the first shell encloses an internal gas passage 302, the second shell encloses a gas passage 304, the third shell a gas passage 306, and the fourth shell a gas passage 308. The fifth shell 294 encloses a relatively thin space 310 adjacent the trailing edge having only a small cross sectional area, and the flow of fluid to the tip jets may be excluded from this space. It may be pointed out that a blade or wing which tapers in thickness from root to tip may be made employing the above described type of construction. If the taper is straight, the shells can be bent to shape and nested with adhesive between as above described.

The flexible surface 282 extends outwardly and is abutted against the shell 294. The rib 280 may be located at the end of the surface 282 where it abuts against the shell 294. The joint between the two may be sealed with a suitable plastic so as to form a continuous outer surface having the same section as the shell 294. Fluid under pressure is free to pass from the center section 18 into the inner end of the blades through the flexible surface 282 and thence through the passages 302, 304, 306, and 308 to the blade tip 312.

The tip 312 is rounded and slanted backward as shown in FIGS. 12 and 13. The walls of the various passages 302, 304, 306, 308, and 310 are curved backwardly as shown in FIG. 13 to direct the fluid flow rearwardly so that the reaction from the backward flow will provide forward propulsion for the blade tip. These rearward openings form rearwardly directed nozzles from each of the passages having outlet areas substantially smaller than the area of the corresponding passage so that the flow of fluid inside the passages will be substantially less than the velocity of the jet issuing from the openings. Due to the backward slant of the wing tip, the forward jet passage 302 overlaps the jet passage 304. The jet passage 306 is likewise displaced inwardly with respect to the jet passage 304, and so on, to the rear. Thus each jet clears the jet rearward of it. As shown in FIG. 13, deflecting sections 314 may be positioned as shown for instance in the passages 302, 306, and 308, more efficiently to direct the fluid rearwardly. The inner shells may also be progressively cut off at the tips as much as is consistent with adequate strength and balance to lighten the tip.

FIG. 14 shows a modification of the blade tip to adapt it for the burning of fuel in the blade tip to secure additional thrust from the tip jets with a given supply of fluid to the tips by heating this fluid and increasing its volume and its discharge velocity. The tip as shown in FIG. 13 may be cut off a substantial distance from the end, for instance on the line 316 in FIG. 14, and a new tip 318 substituted therefor which may be secured to the blade 16 by any suitable means, such, for instance, as the rivet 320. The tip 318 may be made of a metal or alloy adapted to stand the high temperatures of the combustion inside the tip. The deflectors 322 may be welded in or otherwise fastened by means which will withstand the high temperatures. A spark plug 324 is provided as shown for igniting the combustible mixture of air and fuel supplied to the tip through the blade. Flame guard partitions 326 may also be added to prevent the flame from travelling inwardly into the blade. The length of the tip 318 may be sufficient to permit the substantial completion of combustion within the tip. A high tension lead 330 secured to the wall of the passage 310 may be employed to deliver high voltage energy to the spark plug 324 to provide ignition. After combustion is started and the tip 318 has heated, the spark may be discontinued.

The combustible mixture is supplied to the combustion space within the tip 318 by opening the rotor fuel valve 57, as shown in FIG. 4, so that fuel passes into the vaporizer 63 and issues as vapor from the nozzle 55 where it mixes with the proper amount of air in the passage 54 and is carried through the sealing chamber 65 into the center section 18, thence into the inner end of the surface 282 and shell 294 and through the four passages to the combustion space within the tip 318. The air fuel mixture may be adjusted by proper operation of the fuel valve 57 and the air valve 52.

The operation of the embodiment of FIGURES 1 to 14 inclusive may be as follows: assuming that the aircraft is on the ground with its rotor 14 contracted and retracted as shown in full lines in FIGURES 1, 2, 3, and 6. After the turbo jet engine 50 has been started, the electric motor 90 is started and rotates the screws 78 until the rotor support member 76 is raised to its extended position as shown in dotted lines in FIGURES 1, 2 and 3 and in full lines in FIGURE 4. The rotor air valve 52 is then partially opened by means of control rod 60, the speed of the turbo jet engine having previously been increased to a suitable amount by appropriate advance of its fuel control throttle. Compressed air is then delivered from the turbo jet compressor outlet 56 through the passages 54, 64, 62, 65, 66 and 70 to the center section of the rotor 18 and thence into the flexible inner end 282 of the blades 16 through the blade passages, 302, 304, 306, 308 and 310, FIGURE 13, and out rearwardly through the blade tip propulsive passage 314. This causes the rotation of the rotor 14. When the desired rotative speed is reached the blade extension motors 262 may be started in the proper direction to extend the blades 16 out of the center section 18 to their maximum diameter. When fully extended the motors are stopped either manually or automatically, for instance by limit switches (not shown). Meanwhile, the rotor air valve 52 and the turbo jet throttle may be advanced to supply additional air to bring the rotor up to the desired speed. It will be seen from FIGURES 8 and 10 that the rotation of the motors 262 in the proper direction rotate the worm gears 264, the meshing worm wheel 260, and the worm 258 which is fixed to the worm wheel 260. The worm wheel 254 meshes with the worm 258. The cross shaft 242 is driven by the worm wheel 254 and in turn drives the pinions 252. These pinions engage the twin racks 248 and the rotation of the pinions in the proper direction moves the blade carriage 192 outwardly carrying the blade with it. As the blade carriages 192 reach the outer end of their travel, the pitch control sectors 216 which move outwardly with the carriage engage and mesh with stationary pitch control sectors 210 and 214. As the blades 16 are now fully extended from the center section, movement of the cyclical pitch control lever 102 will now effect differential pitch change of opposite blades 16 while the movement of collective pitch lever 166 will effect collective pitch change of the blades. It may be noted that the position of the blades 16 while they are only partially extended from the center section is such that they are held firmly at zero angle of incidence while the weight of the aircraft is supported by the fixed wing. If the pitch control lever 102 is neutralized and the collective pitch control lever 160 is in the zero lift position as the blades 16 approach the fully extended position, the movable sectors 216 will mesh properly and freely with the stationary sectors 210 and 214. The pitch control levers should therefore be moved to these positions as the movable sectors engage the pitch control sectors.

The aircraft is now ready to take off as a helicopter when the rotor 14 driven by the tip jets has been brought up to the proper speed. If the compressed air supply available from the turbo jet engine 50 is sufficient, the rotor may be brought up to the proper speed by merely opening the rotor air valve 52 and the turbo jet throttle to a sufficient extent. Under these circumstances the direct discharge of the air from the tip jets as shown in FIGURES 12 and 13 is alone employed. This requires a relatively large delivery of air from the turbo jet compressor. However, this air may be available if a turbo jet compressor power unit is employed large enough to provide sufficient thrust for very high speed fixed wing flight. The quantity of air supplied by the compressor may be greatly reduced or more rotor power may be supplied with a turbo jet compressor of given capacity if additional fuel is burned in the air delivered to the blade tips as shown in FIGURE 14. When this arrangement is employed the tip jet fuel valve 57 is opened by means of the control 59 to allow fuel to flow from the fuel supply 61 through the vaporizer 63 where it is vaporized, for instance by the waste heat from the turbo jet exhaust passage. The vaporized fuel is then discharged from the nozzle 55 into the rotor air passage 54. It is carried from this point, together with the air, to the blade tips as previously described for the compressed air alone. A correct mixture for burning in the tips may be supplied either by manual or automatic adjustment of the controls 59 and 60 relative to each other. The automatic adjustment of these controls may be effected, for instance in the manner shown in the Doblhoff Patent 2,540,190. Delivery of fuel to the blade tips already mixed with the combustion air is particularly advantageous where a contractible rotor, such as that herein described, is employed as it would be difficult to deliver the unmixed fuel to the blade tips with contractible blades. The pre-mixing of the fuel with the air is also advantageous in that greater time is available for proper mixing and the effect of centrifugal force on solid fuel lines is also avoided. The fuel air mixture delivered to the blade tips may be ignited by the spark plug 324, and the combustion may be confined to the tips by means of suitably positioned flame arrester partitions 326. The ignition cable 330 may be led inward and fixed at the forward end of the passage 310, which is small in area and is not needed to carry the fuel air mixture. It may be pointed out that as shown in FIGURE 14 the walls 318 of the tip chamber in which combustion takes place should be suitably made of a heat resisting alloy capable of standing the high heat generated by the burning of the combustible mixture. When combustion of additional fuel is effected in the blade tips in accordance with FIGURE 14, a given jet velocity can be obtained from jet openings of given area with a much smaller volume of air delivered to the combustion chamber because of the expansion of the air due to the heat of combustion. Due to the fact that the air is relatively cool when passing through the blades and the passages connecting the blades with the compressor, the velocity through these passages for a given mass flow and the attendant frictional losses are reduced. There is still further reduction in this velocity compared to the jet velocity as the area of the passages on the compressor side of the combustion chambers are large compared to the area of the tip jet opening. The amount of air which must be bled from the turbo jet compressor to provide the desired amount of propulsive thrust at the rotor tip may be very substantially reduced by the burning of fuel at the blade tips. It will be understood that when air is bled from the turbo jet compressor to drive the rotor, the forward thrust of the turbo jet will be greatly reduced. However, no forward thrust is required for vertical take-off, only sufficient jet velocity to provide yaw control by means of the jet rudders 28. When the rotor has been brought up to speed, take-off is effected by pulling backward on the lever 166 to increase the collective pitch, pitch and roll control being effected by the proper manipulation of the lever 102. If it is desired to rise vertically, the lever 102 may be pulled backward somewhat to cause the lift vector of the rotor to slant backward sufficiently to overcome the forward thrust of the turbo jet. When sufficient height has been attained, a forward movement of the stick 102 will cause the aircraft to gain forward speed. As forward speed increases, less rotor power is required to sustain the weight of the aircraft and the air valve 52 may be moved toward the closed position. If fuel is being burned at the rotor tip, a corresponding movement of the control 59 may also be effected. This will reduce the amount of air bled from the turbo jet compressor so that more air will be available to the turbo jet for forward thrust. This will permit an additional opening of the turbo jet throttle without increasing the turbine intake temperature. Thus, the turbo jet forward thrust will increase rapidly as the air bled to the rotor is reduced. It may be mentioned here that increasing the air bled from the turbo jet will necessitate reduction of the turbo jet fuel supply if a predetermined turbine intake temperature is not to be exceeded. However, if conservative normal maximum temperature is employed, this could of course be exceeded temporarily during a short period of take-off. After take-off the alighting gear may be retracted and if conversion to high speed fixed wing flight is desired, the turbo jet throttle may be advanced and the collective pitch of the rotor progressively reduced as the speed increases by advance of the lever 166.

The angle of incidence of the fixed wing 20 must be sufficiently positive that, as the collective pitch of the rotor is reduced, the weight of the aircraft will be transferred from the rotor to the fixed wing. When the weight of the aircraft can be carried by the fixed wing 20, the collective pitch lever 166 is positioned to bring blades 16 to the angle of zero lift and the plane of the rotor may be parallel to the flight direction. The stick 102 may be in the neutral position so that there is zero cyclical pitch change of the rotor blades. As the rotor is mounted on its shaft by the flapping hinge pin 200, the rotor shaft may be perpendicular to the flight direction to maintain the rotor at zero angle of attack. The fixed wing should have a considerable angle of attack to provide the total lift at near its minimum forward speed. There could therefore be an appropriate angular relation between the rotor shaft and the fixed wing to transfer completely all the load to the fixed wing and to leave the rotor in a zero lift condition preparatory to rotor contraction. It is also important that the angle of the fuselage, with relation to the angle of the fixed wing, should be such as to produce minimum drag during high speed flight. If the rotor shaft is perpendicular to the major axis of the fuselage, then the fixed wing 20 must be given a substantaial positive angle relative to the major axis of the fuselage so that the fixed wing will support the total weight with the plane of the rotor parallel to the flight direction prior to rotor contraction. In this case the fuselage would be tail high during high speed flight. An alternative to this would be to mount the wing 20 so that its angle relative to the fuselage may be varied, or it may be mounted at a low angle with respect to the fuselage and depressible trailing edge flaps provided to produce the high lift. An advantageous alternative is to mount the fixed wing at an angle to the fuselage equal to or slightly greater than the high speed angle of incidence and to mount the rotor shaft with a forward slope relative to the fuselage. The alighting gear would then be arranged so that the fuselage rested tail low on the ground with the plane of the rotor parallel to the ground. In this case the fuselage and fixed wing would both be at a considerable positive angle of incidence relative to the flight direction during transition. During high speed flight the fuselage and fixed wing would have suitable low drag angles and the angle of the rotor shaft has no effect at high speed because the rotor is retracted. This latter arrangement is advantageous as no variable wing incidence or flaps are required and suitable angle between the wings and fuselage at high speed are provided. The positive fuselage angle at the transition speed is quite acceptable. This arrangement is illustrated in FIGURE 23. The chord of the fixed wing A may be mounted for instance at an angle of five degrees relative to the major axis of the fuselage B. The axis of the rotating wing C may be mounted at a forwardly slanted angle of eighty five degrees relative to B. Thus when the plane of the rotor is parallel to the flight direction the fuselage axis B has a five degree angle and the wing chord A a ten degree angle relative to the flight direction. During transition the stick 102 should be in neutral to permit proper engagement of the control sectors 210, 214, 216. Therefore, elevators 25 may be provided with sufficiently powerful trimming tabs 27 so that the wing 20 may be given for instance a ten degree angle of incidence to the flight direction with the stick 102 in neutral by means of trimmer control 29. It will also be seen from FIGURE 23 that during high speed flight when the rotating wing is retracted the fixed wing chord may have a two and one-half degree positive angle of incidence relative to flight direction while the angle of the fuselage axis B has a two and one-half degree negative angle thereto.

When the rotor is in its no lift condition, the rotor air valve 52 may be completely closed and the jet drive of the rotor completely shut off. When the rotational speed of the rotor is reduced to the point where the centrifugal force, tending to maintain the blades 16 in their extended position, is sufficiently reduced the electric motors 262 are started in the proper direction to retract the blades 16 into the center section 18. After the blades 16 have moved inwardly until the flexible section 282 and the rigid section beyond it are within the center section 18, the blades 16 disconnect from the blade pitch control by the unmeshing of the sectors 216 from the sectors 210 and 214. As the blades 16 are approximately at the angle of zero lift, they are in position for retraction and they may be retracted without any change of angle. After the disconnection of the blade pitch control, the stick 102 may be manipulated as desired for pitch and roll control by means of the ailerons 21 and elevators 25 while the blades 16 are held at zero pitch by their entry into the center section 18. Due to the flapping pivot 200, the plane of the rotor will tend to follow the movements of the fuselage in response to the ailerons 21 and elevators 25 as the rotor will tend to remain perpendicular to its shaft 68. When no torque is exerted on the blades either from the tip jets or from autorotation, they will tend to slow down and stop. However, the slowing will be retarded by the inward movement of the blade masses during contraction. The angular deceleration may be increased by means of rotor brake 69 applied to rotor shaft 68 or decreased by appropriate opening of rotor jet valve 52. During or after contraction of blades 16 into the center section 18, the relative air flow over the inner part or all of the retreating blades will reach zero or reversed velocity due to the aircraft's forward speed. However, as the rotor is operating at very small or zero lift, there is little or no problem of unequal lift on the advancing and retreating blades. Nevertheless, it may be desirable that the blades 16 be completely or nearly completely contracted within the center section before the tip speed becomes less than the forward speed of the aircraft, that is before the advance ratio exceeds unity. This would prevent any great reversal of flow except over the center section which is symmetrical, fore and aft, chordwise and very rigid. The blade section may also be symmetrical chordwise. On the other hand, the speed of the blade at the start of and during contraction should not be more than necessary to maintain adequate blade stability so that contraction motors 262 may overcome the centrifugal forces without being of excessive bulk. When the blades 16 have been completely contracted within the center section 18, the motors 262 are stopped either manually or automatically and the center section 18 is brought to a full stop with its major axis parallel to the major axis of the fuselage by proper manipulation of the rotor brake 69, the rotor air supply valve 52, or both. After the blades 16 are completely contracted into the center section 18, the rotor is relatively compact and has much greater rigidity than when extended. The electric motor 90 may now be started in the proper direction to lower the elevator member 76 by means of the screws 78 to retract the contracted rotor 14 into the depression 12 in the top of the fuselage. In this position it fills the depression 12 and forms a smooth continuation of the top surface of the fuselage, as shown in full lines in FIGURES 1, 2 and 3. The aircraft now has the smooth streamlined exterior of a high speed fixed wing jet aircraft and may proceed to carry out its mission as such.

If it is not intended for operation at very high altitudes, the fixed wing 20 may be smaller than would be required if landing and take-off were not effected by means of the rotating wing. It may be pointed out that little, if any, drag is added to the aircraft by the rotating wing when retracted. The main price paid for the great advantages of the rotating wing is the added weight which this entails. However, this may be offset by a reduction of weight due to a smaller fixed wing without flaps and a much lighter landing gear than is required for high speed landing and take-off. Even very low retractible skids, not shown, might be employed for this purpose instead of wheels. It will also be seen that no extra power plant, compressor, reduction gearing or counter torque device is required for the rotor drive and that the large turbo jet power plant required for flight at high Mach numbers supplies a very ample source of rotor power at low speed when little forward jet thrust is required. The pressure jet rotor drive provided, while consuming considerable fuel, need only be operated for short periods. A further aid to the reduction of drag is the retraction of the contracted rotating wing behind the pilot's cockpit, which avoids adding any projected area for the retracted rotating wing at the top of the fuselage. Thus, high speed and the ability to hover motionless is supplied in a single aircraft with minimum added weight and little or no added drag by comparison even to a turbo jet fighter aircraft.

When the aircraft arrives at its destination flying as a fixed wing turbo jet aircraft, conversion from fixed wing to rotating wing flight for landing may be effected by following a procedure generally the reverse of that described in converting from rotating wing to fixed wing flight. The electric motor 90 is started in the proper direction to raise the rotor 14 to its uppermost position where the rotor may be extended to its maximum diameter and may flap around the flapping bearings 194, 200 without the tips of the blades 16 striking the top of the fuselage or the tail. It should be noted however that before this is done the speed of the aircraft should be reduced to near the minimum safe speed for fixed wing flight. After the rotor 18 is elevated, it is put into rotation by means of opening the rotor air valve 52. If the tip burners are to be operated, these may be started when the blades 16 are considerably extended. The extension of the blades is accomplished by starting the motor 262 in the proper direction to extend the blades 16 outward from the center section 18. It may be noted that when the blades are being expanded, the centrifugal force aids the motors 262 in effecting the expansion and it is therefore not necessary to keep the speed of the rotor low during expansion to avoid excessive load on the motors as may be the case during contraction and it may be desirable to increase the speed of the rotor before extension is started so as to eliminate or reduce reverse air flow over the retreating blade during expansion. When the blades near the end of their outward travel, the controls 102 and 166 should be properly positioned to facilitate the meshing of the pitch control sectors 210, 214, and 216. As the rotor expands, more power must be supplied to increase its rotational speed by appropriate opening of the valve 52 and the valve 57 when and if the tip burners are employed. After the rotor is fully expanded and up to speed, the collective pitch control is increased and the weight of the aircraft is gradually transferred from the fixed wing to the rotating wing. If rotating wing flight is to be continued for some time, part of the weight may be carried by the fixed wing but considerable weight should be transferred to the rotor by pulling backward on lever 166 before the forward speed of the aircraft is reduced below the full load stalling point of the fixed wing 20. Prior to landing the turbo jet forward thrust will be considerably reduced by the air bleed to the rotor jets but speed can be reduced to zero by sufficient backward movement of the stick 102 in spite of any jet thrust remaining. It will be understood that during rotor flight, pitch and roll are controlled by the lever 102 and yaw by the foot pedals operating the jet rudders 28 working in conjunction with the rudders 26. The same motions of the same controls also perform the similar functions during fixed wing flight. Prior to landing, the landing gear is extended and the aircraft is lowered onto the ground by appropriate operation of the lever 166 and proper manipulation of the turbo jet fuel control throttle. After landing the rotor may be contracted and retracted if desired in a manner similar to that previously described.

In the event that the turbo jet power plant should fail during fixed wing flight, the extension rotation and expansion of the rotating wing may have to be effected without tip jet drive normally employed to start rotation of the rotor. A source of electric power may be provided for the extension motor 90 and the expansion motors 262. An additional motor 71 may be employed, operated from the same electric power source connectable to the rotor shaft 68 by means of a disengageable gear drive, not shown, which may be similar to an automobile starter drive. As soon as the rotor is extended by the motor 90, the starting motor 71 may be energized to start the rotor turning. The elevator 25 should be raised by a backward movement of the stick 102 enough to start and to maintain auto rotation. Then the blades may be expanded by means of the appropriate rotation of the motors 262. The motor 71 may automatically disengage itself from the rotor shaft 68 when the rotor becomes air driven. When the rotor is completely expanded, the pitch of the blades 16 are controllable by the stick 102 and collective pitch lever 166 and a normal autorotational power off landing can be made, as in the conventional helicopter or autogyro.

It will be seen that changes from one flight regime to another may be effected gradually and with the minimum possibility of instability during transition. The stability of the rotor during expansion and contraction is effected by relieving the rotor of all or nearly all lift, maintaining zero or no lift angle of incidence of its blades, and zero or no lift angle of the rotor disc to the flight direction. It is also desirable to maintain sufficient rotative speed to avoid or minimize reversal of the flow over the blades 16, at least near the tips, until they are completely or considerably contracted within the center section 14. The main limitation on the employment of this procedure is overcoming the centrifugal force of the blades while in rapid rotation during contraction. This may require compromise between the rotative speed desired and the forces which may be practically provided for retraction by motors 262.

FIGS. 15, 16 and 17 illustrate a modified rotating wing which is not adapted for contraction to a reduced diameter but which may employ a blade construction similar to that shown in FIGS. 11, 12, 13, and 14 and which also may be driven by rotor tip jets supplied with fluid by means similar to those shown for instance in FIGS. 2 and 4. The aircraft which carries this non-retractible rotor may be regarded as similar to the aircraft of the previously described embodiment when its rotor is extended immediately prior to retraction for high speed fixed wing flight. In other words, the high speed flight of the non-retractible rotor aircraft is similar to the transitional flight condition of the retractible rotor aircraft. The pitch change mechanism below the hub of the non-retractible rotor may also be similar to that of the previously described embodiment. Closely similar parts in this and the preceding embodiment are indicated by similar numbers.

A flexible section 282 connects the hub casing 332 to the blade 16. The casing 332 is mounted on the hub flange structure 334. The housings 228 and 230 for the bearings 220 and 222 are carried on the hub flange structure 334. The blade root member 218 may be secured at its outer end to the blade 16 as described in the previous embodiment and its inner end may be mounted in the bearings 220 and 222 for pitch change as previously described.

The sector 216 on the blade root member may mesh permanently with the sector 210 on the pitch change shaft 208. This shaft is held in bearings 336 and 337. Fixed to the inner end of the shaft 208 are pitch change levers 206. These connect to control rods 138, and the pitch change mechanism may be as previously described and as described in Andrews Patent No. 2,511,687. The hub flange 334 is secured to the shaft 68 through flapping bearings 194, 198, pin 200 and yoke 196 as previously described. The hub flange 334 is sealed to the rotating element of the sealing chamber as previously described and shown, and the seal between the rotating member of the sealing member 66 and the stationary member of the sealing chamber 65 is similar.

As the non-contractible rotor of this embodiment is adapted for an aircraft having a lower top speed than that shown in the previous embodiment, a smaller turbo compressor for an aircraft of similar weight may be employed. Because of the lower top speed the forward jet thrust may be augmented by a directed fan or small diameter high speed propeller drawn by a separate stage of the turbo compressor. A large propeller is unnecessary as take-off is effected by the rotor and requires little or no forward thrust. As in the previous embodiment, the rotor may be driven by fluid supplied to the tip jets under pressure from the turbo compressor similar to the compressor 50 of the turbo jet engine 22 shown in FIGS. 2 and 4, and rotor fuel may be added to the air as shown in FIG. 4 and burned in the blade tip as shown in FIG. 14.

The aircraft on which the rotating wing of FIGURES 15, 16 and 17 is mounted may be somewhat similar to FIGURES 1, 2 and 3 without rotor retraction and may be without the swept-back wings. The fuselage may be considerably shortened from the front due to the non-retractible rotor. When the rotor is employed for hovering flight, the air bleed from the turbo compressor to the rotor will take most of the power and the separate turbine stage driving the propulsive fan will slow down and deliver only small forward thrust. The power from the common turbo power source may also be cut off from the rotor and transferred to the propulsive or ducted fan by closing the valve 52 and making proper turbo jet throttle adjustments. The rotor and fixed wing controls may be linked as previously shown but without the provisions required for rotor retraction and extension. The axis of the rotor may be substantially perpendicular to the major axis of the fuselage as shown and the chord of the fixed wing may have a moderate angle relative to the fuselage so that this angle is that required for high speed or cruising flight with the axis of the fuselage generally parallel to the flight direction. At top speed the weight of the aircraft is carried mainly by the fixed wing and the rotor is unloaded for maximum reduction of drag.

The rotor control linkage may be unmeshed and the rotor blades locked in zero lift position and the plane of the rotor maintained perpendicular to the rotor shaft by the action of the flapping hinge as previously described.

The non-retractible rotor aircraft may carry little or no weight on the rotor during high speed flight, in which case the rotor must receive sufficient power to maintain a speed of rotation which will provide sufficient rotor stability. This may be effected by small discharge of fluid from the tip jets or the rotor may be adjusted to supply the minimum lift required to maintain autorotation. The function of the rotor is to supply lift during hovering and low speed flight. At high speed its stability should be preserved and its drag minimized. As the rotor may provide little or no lift or forward thrust, high speed is not limited by retreating blades stall. The effect of compressibility on the advancing blade may also be largely eliminated by slowing the rotational speed at high forward speed to the minimum angular speed at which stability can be maintained. It may be noted here that in the case of a contractible rotor of a previous embodiment such slowing of the rotor before contraction may be advantageous in that the centrifugal forces opposing contraction are reduced.

FIG. 18 shows a modified means of contracting the blades 16 into and extending them out of the center section 18. In this modification the motors 262 shown in FIG. 10 are not employed. Instead, a motor 338 is permanently located at each end of the center section 18. The motor 338 drives the drum 340 through the reduction gear 342; the pulley 272 is similar to that shown in FIG. 10 but the drum 340 replaces the forward pulley of this pair. Several turns of the cable 268 are wrapped around the drum 340 so that the cable is powerfully driven from the drum. This makes unnecessary the rack 248, gears 252, cross shaft 242, worm wheel 254, worm 258, worm wheel 260, the motor 262, and worm 264, shown in FIG. 10. The motors 338 would be operated to extend and retract the blades in the same way as described in the first embodiment except that it would be unnecessary to provide the rails and brushes required for the motors 262 as the motor 338 is fixed at the ends of the center section and does not travel from one end of the center section to the other as do the motors 262. However, the cable 268 in FIG. 18 must be capable of withstanding greater loads than that shown in FIG. 10 because in the embodiment of FIG. 10 the cable only acts as an equalizer, while in the embodiment of FIG. 18 it carries the full load of the retraction and extension force. Where this embodiment is employed it may be necessary to slow this rotor to a lower rotational speed before rotor blade contraction.

FIG. 19 illustrates an attachment of the rotor of the rotating wing 14 to the shaft 68 which permits pitch change by changing the angle of the center section around an axis 344 perpendicular to the flapping axis. In this embodiment the yoke 346 is connected by flapping bearings 348 to a gimbal member 350. This gimbal member is in turn pivotally mounted to the center section flange 72 by the bearings 352 and the pin 354 which establish the axis 344. By changing the angle of the center section around the axis 344, cyclical or differential pitch change may be secured without changing the angle of the blades 16 relative to the center section 18. The angle change between the blades 16 and the center section 18 may in this embodiment be employed solely for collective pitch change. This may be effected by operating the motor 356 in one direction to reduce collective pitch and in the opposite direction to increase it. Similar parts are given the same numbers in FIG. 19 as in previous embodiments, and the operation of corresponding parts are the same as previously described. The cyclical pitch is changed by rod 358 and pivoted lever 360 which connects to control rod 358. Rod 358 is operated cyclically from the wabble plate 148. The collective pitch change mechanism shown in Andrews Patent No. 2,511,687 would not be required here as the collective pitch is changed by the motor 356, as previously described. The center section 14 and the supply of fluid under pressure from the compressor 50 through the sealing chamber to the center section and thence to the tip jets may be the same or similar to that shown and described in previous embodiments.

The motor 356 may be stopped or operated in either direction by means of triple conductor cable 362 which may be carried into the fuselage through slip rings as previously described, and may be controlled by a three-position reversing switch operated by the collective pitch change lever 166 which would then not require any connection with the pitch change mechanism described in previous embodiments.

FIGS. 20, 21, and 22 illustrate a further embodiment in which the blades 16 are in the same plane instead of being one above the other and in which the blades are less than half as long as the center section and do not contract beyond the center of the center section. The same numbers are employed to designate corresponding parts as in previous embodiments.

FIG. 20 shows the carriages 192 contracted in their innermost position for maximum contraction of the blades 16 into the center section 18. FIG. 21 shows the blades 16 extended to the maximum with the carriage 192 occupying a position adjacent the outer end of the center section 18. The carriages 192 may be operated for expansion and contraction of the blade in a manner similar to that described in previous embodiments. The motors 262 as shown may be replaced by the motors 338, if desired. The blades 16 may be mounted in the carriages 192 for pitch change in the same manner as previously described. FIG. 22 is an end view of the blades 16 and the center section 18. It will be seen that the carriage support plate 364 in this embodiment is located at the lower portion of the center section and that the carriages 192 for both blades are mounted above the carriage support plate 364 instead of one above and one below, as in the previous embodiments. This provides a thinner center section; however, the center section must have a considerably larger diameter for the same expanded diameter of rotating wing as compared with embodiment of FIGS. 8 and 10. However, the operation of expansion and contraction, pitch change, and the supply of rotor propulsive fluid to the rotor from the compressor may be substantially the same as in previous embodiments. This also applies to the construction of the blades including the construction of the tips to supply the propulsive jets. It may be pointed out that in this embodiment the flapping hinge may be in the plane of the blades 16 if desired as both blades 16 are in the same plane and no part of the blades contract past center. The universal joint of FIG. 19 might also be mounted in the same position instead of the single flapping hinge.

Having thus described my invention, what I claim as new and desire to secure by Letters Patent of the United States, is as follows:

1. A rotor having a hollow rigid center section extending outwardly in opposite directions from its center, hollow downwardly extending rotatably mounted hub means at the center of said center section, a flapping hinge connecting said center section to said hollow hub means, two airfoil section blades, one extending radially outward from each end of said center section, bearing means mounting said blades on said center section for rotation about a generally radial pitch change axis, means for changing the pitch of said blades relative to said center section operatively connected to said blades and passing through the interior of said center section and downward through the interior of said hollow hub means, a turbo compressor supplying air under pressure to the interior of said hollow hub through a sealing member permitting flapping movement around said flapping hinge and a flexible pressure sealing connection connecting said blades to opposite ends of said center section to permit angular motion around said pitch change axis, said blades being hollow and provided with fluid jet discharge means.

2. A jet driven rotor blade having an airfoil structure comprising a series of long spanwise generally D-shaped members adapted to nest one within the other, the innermost section being nearest the leading edge, an outermost covering section extending from the leading edge to the trailing edge, a series of webs extending from top to bottom of said airfoil shell formed by the straight side of the D-shaped members and providing a series of unobstructed longitudinal fluid passages through said blade from root to tip, at least one jet orifice near the blade tip communicating with said fluid passages, and means connecting said nested surfaces together to form a unitary structure.

3. A rotor blade having an airfoil structure comprising a series of long generally D-shaped members adapted to nest one within the other, the innermost section being nearest the leading edge and the outermost section extending from the leading edge to the trailing edge, a series of webs extending from top to bottom of said airfoil structure formed by the straight side of the D-shaped member and providing a series of longitudinal fluid passages through said airfoil structure from root to tip, said passages curving rearwardly at the tip to form rearwardly directed jet propulsive orifices, the walls of each orifice projecting outwardly beyond those behind it.

4. A rotor having a hollow hub portion mounted for rotation, a hollow radially extending structure carried by said hub portion, a hollow blade having a propulsive jet orifice mounted on said radial structure for movement from an expanded position to a contracted position lapping said hollow radial structure, means for supplying fluid under pressure to said hub portion including rotatable sealing means and fluid passage means in said hollow radially extending structure providing a free fluid passage from said hub through said hollow radially extending structure to said blade.

5. A contractible rotating wing having a central section, two blades mounted for movement in opposite directions for extension and contraction into overlapping relation with said central section, pulley means at each end of said central section, endless flexible tension resisting connecting means passing around said pulley means, means for connecting one side of said endless tension resisting means to the inner end of one blade, means connecting the other side of said endless tension resisting means to the inner end of the other blade, and two separate power means for moving said blades relative to said central section for contraction and extension, the movement of said blades and said two separate power means being synchronized by said endless tension resisting means.

6. A convertible aircraft having a fuselage, a rotor mounted thereabove, a fixed wing mounted on said fuselage, a swept back tail for pitch control of said fixed wing mounted at the rear of said fuselage and swept back twin rudders mounted one at each outer rear end of said swept back tail, the backward sweep of the tail relative to said fuselage and the backward sweep of said rudders relative to the outer rear ends of said sweptback tail together providing clearance for the tip plane of said rotor.

7. A rotor blade having a radially long airfoil shell divided by chordwise spaced walls to form a series of fluid passages extending from the root toward the tip of said blade, said walls curving rearwardly at the tip to form rearwardly directed jet propulsive orifices, the walls of each orifice projecting outwardly beyond the walls of the more rearward orifices so that each orifice is positioned outwardly and forwardly of the next from rear to front.

8. A convertible aircraft having a fuselage, a fixed wing mounted thereon, a rotor mounted for rotation above said fuselage, a rotor central section having a fluid passage therein extending from hub to end, a rotor blade having a corresponding fluid passage terminating in a propulsive jet, means for contracting said blade within the diameter of the central section, means for varying the pitch of the blade relative to the central section, means movable with said contracting and with said pitch varying means for sealing the fluid passage from the central section to the blade passage, means for retracting said rotor after contraction into lengthwise compact relation with the major axis of said fuselage for high speed flight, a turbo compressor in said fuselage having a compressor connection to the turbine inlet and a turbine outlet connection to a horizontal propulsion jet nozzle, a fluid passage connecting said compressor connection to said center section fluid passage for jet drive of said rotor during low speed flight with rotor extended, extensible sealing means in said passage for sealing said passage when extended while permitting retraction, and a manually controllable valve operable to open said passage, and discharge compressed air from said compressor to rotate said rotor during low speed flight and to close said passage diverting the rotor rotating air flow from the compressor through the turbine and out the horizontal propulsive jet nozzle during high speed flight.

9. A contractible rotor having a hub carrying a substantially radially extending central section, a carriage mounted for radial movement on said central section, a blade mounted on said carriage for contraction into overlapping relation with said center section by the radial movement of said carriage, means for changing the pitch of the blade connecting the blade to the carriage, means to control the radial movement of said carriage, and means to control the pitch of said blade connected to said carriage.

10. A convertible aircraft having a fuselage, a fixed wing mounted thereon, a rotor mounted for rotation above said fuselage, means for retracting the rotor into compact relation with said fuselage for high speed flight, a turbo compressor power means in said fuselage, propulsive jet means on said rotor, pressure resistant fluid connecting means including a plurality of sections movable relative to each other permitting rotor extension and supplying fluid under pressure from the compressor of said turbo compressor means to said jet propulsion means during low speed flight with rotor extended and means for stopping fluid flow to said rotor jet propulsion means and providing horizontal thrust from the turbine exhaust of said turbo compressor means during high speed flight with said rotor and said fluid connecting means retracted and the weight of the aircraft supported by said fixed wing.

11. A rotor having a hollow hub, means for supplying fluid under pressure to the interior of said hub, a blade of hollow airfoil section extending outwardly from said hub having a blade propelling fluid jet orifice, a streamlined central section, flapping axis bearing means connecting said hub to said central section, a flexible sealing member surrounding said flapping axis bearing means and forming a fluid-tight connection between said central section and said hub while permitting relative flapping motion, means mounting said blade on said central section including means permitting pitch change of said blade relative to said central section and a flexible fluid-tight tube of streamlined cross section surrounding said pitch change means, sealed at one end to the streamlined inner end of the blade and sealed at the other end to the streamlined outer end of the central section.

12. In a rotating wing aircraft, a rotor hub, having an internal fluid passage, mounted for rotation thereon, a streamlined central section having an internal fluid passage connected to said hub by a flapping hinge, a source of fluid under pressure in said aircraft, sealing means permitting relative rotation connecting said hub passage to said fluid pressure source, a flexible sealing member surrounding said flapping hinge and forming a fluid-tight connection between said central section and said hub while permitting relative flapping motion, an airfoil blade having an internal fluid passage connected to jet propelling means near the blade tip, means permitting relative rotation for pitch change, means mounting said blade on said central section and a flexible fluid-tight conduit of streamlined cross section surrounding said pitch change means and sealed at one end to the streamlined inner end of said blade and sealed at the other end to the streamlined central section passage.

13. A rotor having a rigid center section extending radially outward from the center on opposite sides, blade retracting means movable spanwise relative to said central section from one side to the other of said center, a blade extensible outward from said central section, means permitting pitch change of said blade relative to said central section mounting said blade on said blade retracting means, means mounting said central section for rotation, a flapping hinge substantially at the bottom of said center section connecting said center section to said mounting means establishing a flapping axis substantially at the bottom of said center section and blade, means for causing spanwise movement of said blade retracting means, and means for causing differential and collective pitch change of said blade.

14. A rotor having a rigid center section extending radially outward from the center on opposite sides, blade retracting means movable spanwise relative to said central section from one side to the other of said center, means mounting said center section and blade for rotation, a universal joint substantially at the bottom of said central section connecting said central section to said mounting means said universal joint establishing a flapping and differential pitch change axis substantially at the bottom of said central section and blade, means associated with said blade retracting means for causing inward and outward movement of said blade relative to said central section, and means for causing differential pitch change around one axis of said universal joint between said center section and said mounting means.

15. In an air screw, a hub mounted for rotation, a blade operatively connected to said hub, said blade comprising a series of at least three long sheets formed all along the spanwise blade axis into generally D-shaped members adapted to nest one within the other to form a forward airfoil shell section with a series of longitudinally extending chordwise spaced webs, each forward sheet member being a web as well as part of the airfoil shell, a surface covering extending from the leading edge and forming the trailing edge of said blade, and means for securing together said sheet members and said covering when nested to form a unitary airfoil structure.

16. In an air screw, a hub mounted for rotation, a blade operatively connected to said hub, said blade comprising a series of long sheets formed all along the spanwise blade axis into generally D-shaped members adapted to nest one within the other to form a forward airfoil shell section with a series of longitudinally extending chordwise spaced webs, each forward sheet member forming part of the airfoil shell and also one web, a surface covering extending from the leading edge and forming the trailing edge of said blade, means for securing together said sheet members and said covering when nested to form a unitary airfoil structure, and a spar member for securing the blade to the hub, firmly secured between two of the forward webs.

17. In an air displacing airfoil, an airfoil structure comprising a series of long metal sheets formed all along the spanwise axis into generally D-shaped members with the sheet edges overlapping on the straight side and adapted to nest one within the other to form a forward airfoil shell section with a series of longitudinally extending webs spaced chordwise from each other, each of at least the forward sheet members forming a part of the airfoil shell and also one web, a surface covering extending from the leading edge and forming the trailing edge of said blade, and means including an adhesive bonding material covering the nested surfaces securing said sheet members and said covering together to form a unitary airfoil structure.

18. In an air displacing airfoil, an airfoil structure comprising a series of long sheets bent all along the spanwise wing axis into generally D-shaped members adapted to nest one within the other, the innermost member being nearest the leading edge and having the greatest sheet thickness, and an outermost covering of airfoil section extending from the leading edge to the trailing edge and having a lesser sheet thickness than the innermost member, a series of chordwise spaced webs extending from top to bottom of said airfoil shell formed by the straight side of the D-shaped members, and adhesive means connecting said nested surfaces together to form a unitary airfoil shell structure with walls and webs progressively thinner from front to rear.

19. A rotor blade having a radially long airfoil shell and a series of chordwise spaced internal webs connecting the top and bottom of said shell to form a series of fluid passages from the root toward the tip of said blade, occupying at least a major portion of the chord, a chamber occupying at least a major portion of the chord at the blade tip comprising an airfoil shell of strong heat-resistant material into which said passages connect, at least one rearwardly curving jet-propulsive passage at the outer end of said chamber, a source of air and combustible fluid connected into said blade passages at the root of said blade whereby the major portion of the blade chord carries propulsive fluid in passages adapted to reduce turbulence and resist internal pressure, metallic flow dividing means where said passages join the inner end of said chamber adapted to cool and increase the velocity of said propulsive fluid whereby combustion is restricted to said chamber, and ignition means in said chamber.

20. A contractible rotor having a hub and a central member extending radially therefrom, a blade slidably mounted for longitudinal movement along said central member outwardly into expanded position and inwardly into contracted position in which said blade is at least partially coextensive with said central member, radially slidable means connecting said blade to said central radial member establishing a blade pitch change axis generally parallel to the major axis of said radial member and means on said central radial member for changing the pitch of said blade relative to said central radial member.

21. A contractible rotor having a center section comprising a rigid structure generally coextensive therewith, a carriage mounted for longitudinal movement on said structure, longitudinally extending guide means carried on said structure, means on said carriage engaging said guide means at points separated longitudinally and establishing fixed relation between said carriage and said rigid structure in a vertical and horizontal plane while permitting longitudinal carriage movement, a rotor blade mounted on said carriage and secured to said carriage by bearing means at longitudinally separated points establishing a fixed relation between said blade and said carriage in a vertical and horizontal plane while permitting angular movement for pitch change, and hub means mounted for rotation carrying said rigid structure.

22. A contractible rotor having a central hollow structure of low drag form, comprising an outer shell, an internal chordwise member extending from edge to edge and radially coextensive therewith, a rigid structure extending radially along each edge and secured to said internal chordwise member and to said shell, two blades mounted one above and one below on said chordwise member for contraction into and extension from said hollow central structure, radially movable means connecting the inner end of said blades to said internal chordwise member establishing a fixed relation between said blades and said internal chordwise members in a vertical and horizontal plane while permitting angular movement for pitch change of said blades, and hub means mounted for rotation carrying said central hollow structure.

23. A contractible rotor having a central hollow structure of low drag form, comprising an outer shell, an internal chordwise member extending from edge to edge and radially coextensive therewith, a rigid structure extending radially along each edge and secured to said internal chordwise member and to said shell, two blades mounted above said chordwise member for contraction into and extension from said hollow central structure, radially movable and laterally rigid bearing means connecting the inner ends of said blades to said internal chordwise members establishing a fixed relation between said blades and said internal chordwise members in a vertical and horizontal plane while permitting angular movement for pitch change of said blades, and hub means mounted for rotation carrying said central hollow structure.

24. A convertible aircraft having a fixed wing and a rotor, roll control surfaces for said fixed wing movably mounted thereon, separate rotor control means on said rotor, means for extending and retracting said rotor, a manually movable control means, means connecting said movably fixed wing control surfaces to said manual control means, means for connecting said rotor control means to said manual control means, and means associated with said rotor retracting means and included in said rotor control connecting means for disconnecting said rotor control means from said manual means when said rotor is retracted.

25. A convertible aircraft having a fixed wing with movable control surfaces and a variable pitch rotor having pitch control means, a turbo jet power means including an air compressor and at least one turbine driving said air compressor, combustion chamber means connected to the input of said turbine, a passage connecting the output of said compressor to the input of said combustion chamber means, means for applying large forward thrust to said aircraft comprising a jet nozzle directly connected to the exhaust of said turbine directing the turbine exhaust rearwardly, fluid jet means for rotating said rotor, a pressure-resistant passage for air under pressure connected at one end to the passage between the air compressor and the combustion chamber means and at the other end to said fluid jet means, cut-off valve means in said pressure-resistant passage, means for converting from low speed flight with the aircraft controlled by, and its weight supported by the rotor, to high speed flight with the aircraft controlled by, and its weight supported by the fixed wing, including manual means for operating said movable control surfaces of the fixed wing independently for high speed flight and for operating both the movable control surfaces of the fixed wing and said pitch control means of the variable pitch rotor together for low speed flight and manually operable means for closing said cut-off valve for high speed flight and for opening said cut-off valve for low speed flight.

26. A convertible aircraft having a fuselage, a fixed wing mounted thereon, a lifting rotor mounted for rotation above said fuselage, means for retracting the rotor into compact low-drag relation with said fuselage for high speed flight, a turbo compressor power means in said fuselage, rearwardly directed propulsive jet nozzle means near the periphery of said rotor, fluid passage means from said propulsive jet nozzle means to the hub of said rotor, a pressure-resistant fluid connecting means including a plurality of sections movable relative to each other permitting rotor extension and retraction and supplying fluid under pressure from the compressor of said turbo compressor means to the hub of said rotor and thence to said propulsive jet nozzle means during low speed flight with rotor extended, and movable valve means for cutting off fluid flow to said propulsive jet nozzle means and for redirecting said fluid flow and said turbine exhaust of said turbo compressor means, to provide horizontal thrust during high speed flight with said rotor and said multiple section fluid connecting means retracted and the weight of the aircraft supported by the fixed wing propelled by said horizontal jet thrust.

27. A convertible aircraft having a fuselage, a fixed wing mounted thereon, a radially expansible and contractable rotor mounted for rotation above said fuselage, means for first contracting and then retracting the rotor into compact low-drag relation with said fuselage for high speed flight, a turbo compressor power means in said fuselage, rearwardly directed propulsive jet nozzle means near the periphery of said rotor, fluid passage means from said propulsive jet nozzle means to the hub of said rotor, a pressure-resistant fluid connecting means including a plurality of sections movable relative to each other permitting rotor extension and retraction and supplying fluid under pressure from the compressor of said turbo compressor means to the hub of said rotor and thence to said propulsive jet nozzle means during low speed flight with rotor extended and expanded, and movable valve means for cutting off fluid flow to said propulsive jet nozzle means and for redirecting said fluid flow and said turbine exhaust of said turbo compressor means, to provide horizontal thrust during high speed flight with said rotor contracted and retracted and said multiple section fluid connecting means retracted and the weight of the aircraft supported by the fixed wing propelled by said horizontal jet thrust.

References Cited in the file of this patent

UNITED STATES PATENTS

| | | |
|---|---|---|
| 1,848,389 | Sikorsky | Mar. 8, 1932 |
| 1,877,902 | Kuethe | Sept. 20, 1932 |
| 2,094,105 | Myers | Sept. 28, 1937 |
| 2,362,301 | Pecker | Nov. 7, 1944 |
| 2,383,139 | McGuire | Aug. 21, 1945 |
| 2,423,095 | Gibson | July 1, 1947 |
| 2,429,646 | Pullin | Oct. 28, 1947 |
| 2,464,285 | Andrews | Mar. 15, 1949 |
| 2,477,113 | Campbell | July 26, 1949 |
| 2,481,502 | Downing | Sept. 13, 1949 |
| 2,523,216 | Isacco | Sept. 19, 1950 |
| 2,601,258 | Brozozowski | June 24, 1952 |
| 2,606,728 | Sikorsky | Aug. 12, 1952 |
| 2,631,676 | Hiller | Mar. 17, 1953 |
| 2,640,549 | Isacco | June 2, 1953 |
| 2,663,374 | Vandermeer | Dec. 22, 1953 |
| 2,674,327 | Pullin et al. | Apr. 6, 1954 |
| 2,674,421 | De Cenzo | Apr. 6, 1954 |
| 2,690,886 | Laskowitz | Oct. 5, 1954 |
| 2,710,067 | Pesaro | June 7, 1955 |
| 2,740,482 | Hiller et al. | Apr. 3, 1956 |
| 2,756,007 | Laskowitz | July 24, 1956 |
| 2,818,223 | Doblhoff | Dec. 31, 1957 |

FOREIGN PATENTS

| | | |
|---|---|---|
| 934,803 | France | Jan. 19, 1948 |
| 996,034 | France | Aug. 29, 1951 |